(12) United States Patent
Ikeda et al.

(10) Patent No.: US 7,187,785 B2
(45) Date of Patent: Mar. 6, 2007

(54) IMAGE PROCESSING METHOD AND APPARATUS

(75) Inventors: Namiko Ikeda, Kanagawa (JP);
Mamoru Nakanishi, Kanagawa (JP);
Koji Fujii, Kanagawa (JP); Takahiro Hatano, Kanagawa (JP); Satoshi Shigematsu, Kanagawa (JP); Hiroki Morimura, Kanagawa (JP); Yukio Okazaki, Kanagawa (JP); Hakaru Kyuragi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 662 days.

(21) Appl. No.: 10/228,396

(22) Filed: Aug. 27, 2002

(65) Prior Publication Data
US 2004/0042640 A1  Mar. 4, 2004

(30) Foreign Application Priority Data
Aug. 28, 2001 (JP) .............................. 2001-258520
Aug. 28, 2001 (JP) .............................. 2001-258525

(51) Int. Cl.
*G06K 9/00* (2006.01)
(52) U.S. Cl. ................ 382/115; 382/254; 382/257; 382/259
(58) Field of Classification Search ............ 382/115, 382/118, 209, 219, 278, 254, 257, 259; 711/163, 711/169, 202; 358/1.1, 444, 538; 399/301; 347/116
See application file for complete search history.

(56) References Cited

U.S. PATENT DOCUMENTS 5,075,769 A * 12/1991 Allen et al. ................. 358/500
6,263,091 B1 * 7/2001 Jain et al. ................... 382/125
6,400,836 B2 * 6/2002 Senior ........................ 382/124
6,721,440 B2 * 4/2004 Reed et al. ................. 382/100
6,744,909 B1 * 6/2004 Kostrzewski et al. ....... 382/115
7,050,648 B1 * 5/2006 Shinbata ..................... 382/274

FOREIGN PATENT DOCUMENTS

JP    11-298738    10/1999

OTHER PUBLICATIONS

T.S.Huang, G.J.Yang, and G.Y.Tang, "A fast two-dimensional median filtering algorithm", PRIP' 78, pp. 121-131, 1978.
J. Serra, "Image Analysis and Mathematical Morphology", Academic Press, London, 1982.
P.Margos, "Tutorial on advances in morphological image processing and analysis", Opt, Eng., 26, 1987.
R.M.Haralick, S.R.Sternber and X.Zhuang, "Image Analysis Using Mathematical Morphology", IEEE Transactions on Pattern Analysis and Machine Intelligence, vol. PAMI-9, No. 4, pp. 532-550, Jul. 1987.
M.Nagao and T.Matsuyama, "Edge preserving smoothing", CGIP, vol. 9, pp. 394-407, Apr. 1979.
B.M.Mehtre, "Fingerprint Image Analysis for Automatic Identification", Machine Vision and Applications, vol. 6, No. 2-3, pp. 124-139, 1993.
P.A.Maragos, "Morphological Skeleton Representation and Coding of Binary Images", IEEE Transactions on Acoustics, Speech and Signal Processing vol. ASSP-34, No. 5, Oct. 1986.

* cited by examiner

*Primary Examiner*—Sheela Chawan
(74) *Attorney, Agent, or Firm*—Blakely Sokoloff Taylor & Zafman

(57) ABSTRACT

An image processing apparatus includes an image correcting section. When an image of an object is input, the image correcting section performs correction processing for the input image including the object image and outputs the corrected image as an image required for authentication of the object. An image processing method is also disclosed.

66 Claims, 21 Drawing Sheets

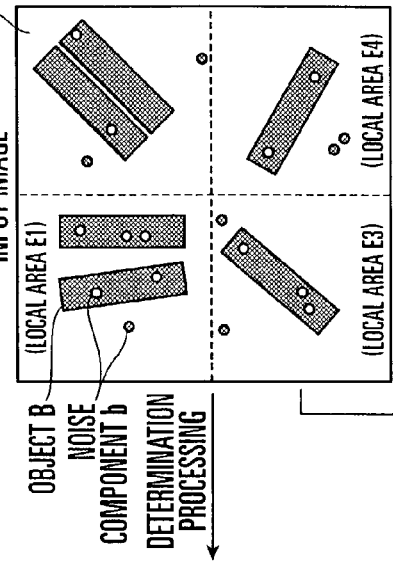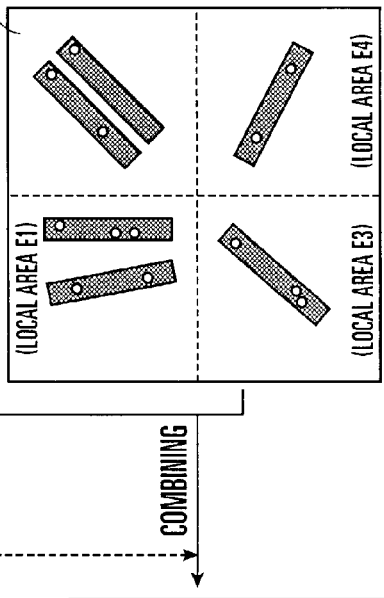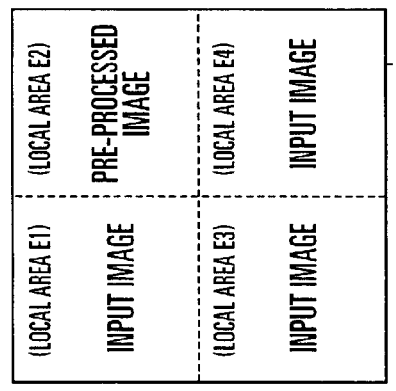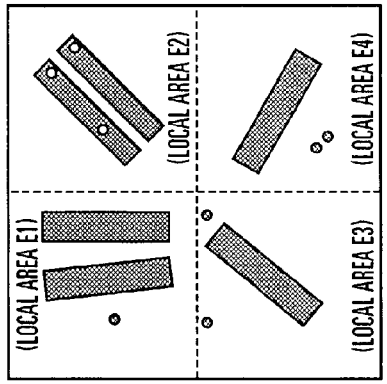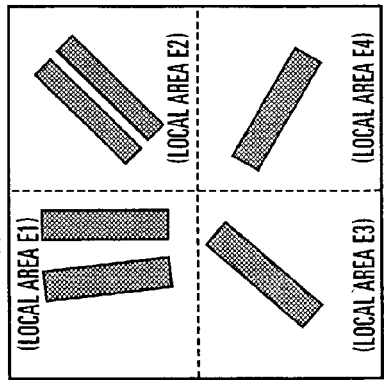
FIG.2A INPUT IMAGE
FIG.2B PRE-PROCESSED IMAGE
FIG.2C DETERMINATION RESULT
FIG.2D COMPOSITE IMAGE
FIG.2E RESULTANT IMAGE

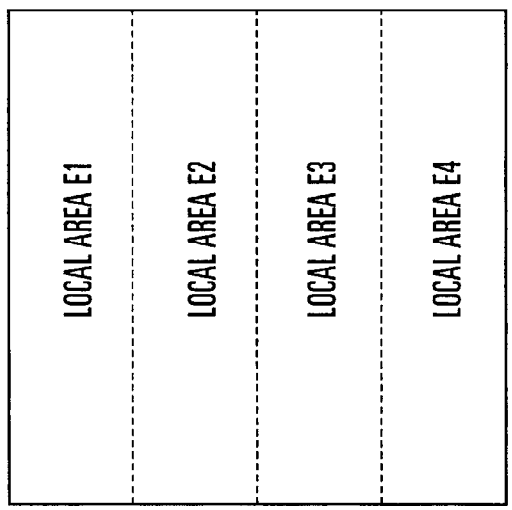
FIG.4A
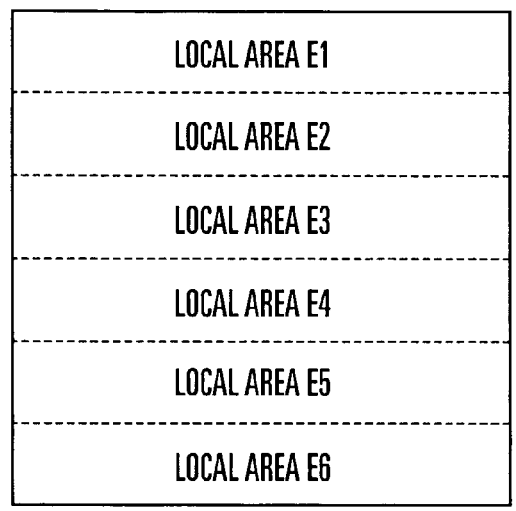
FIG.4B
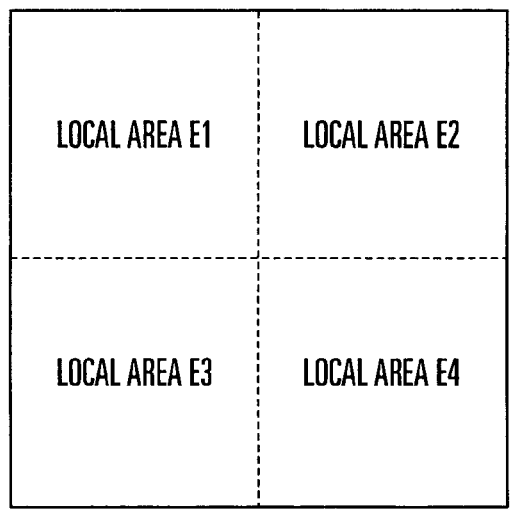
FIG.4C
FIG.4D

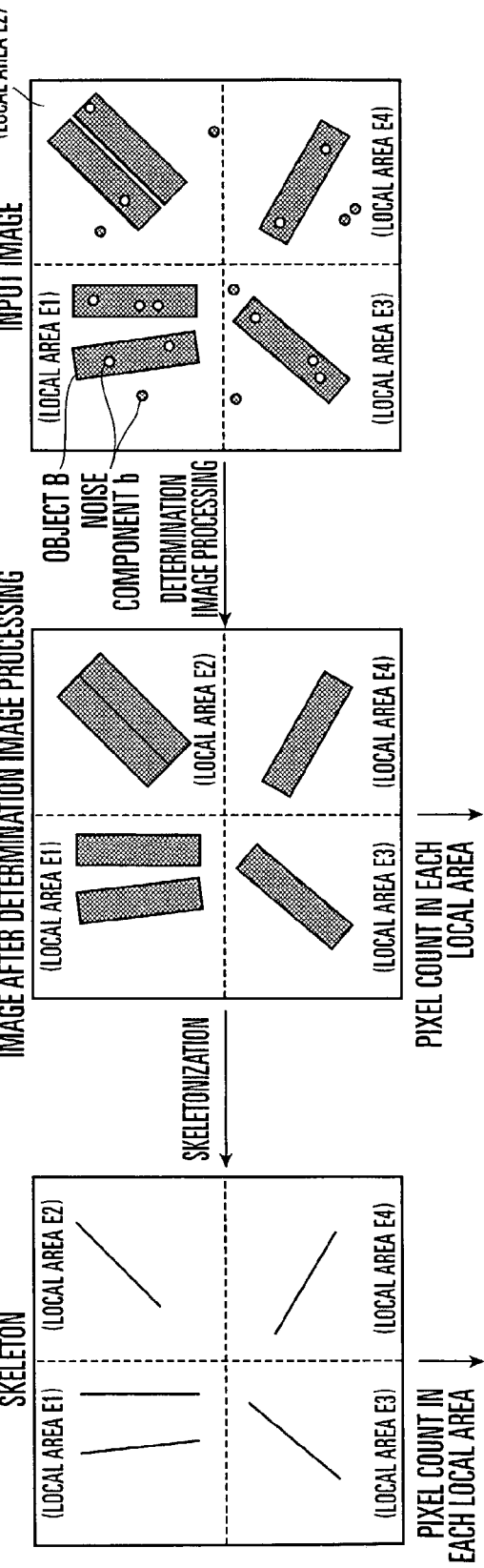

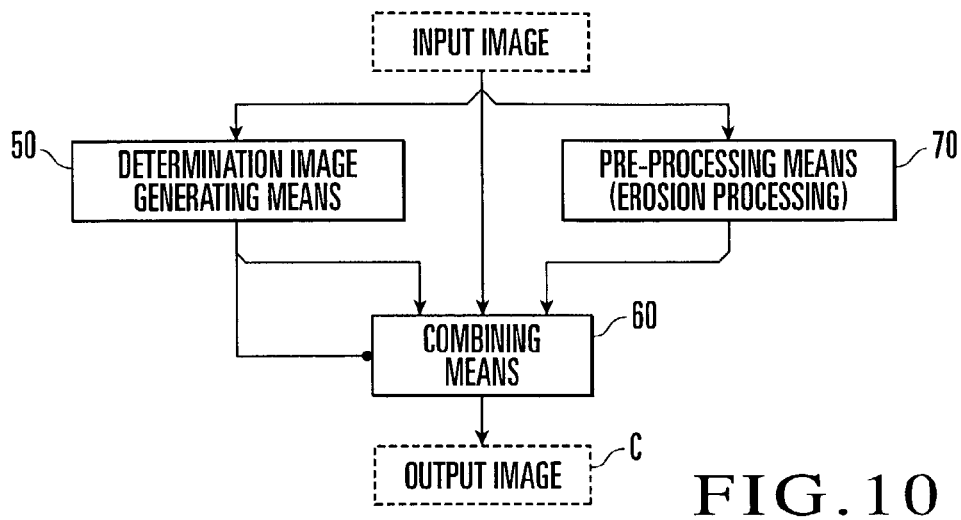
FIG.10
FIG.11B
DETERMINATION IMAGE
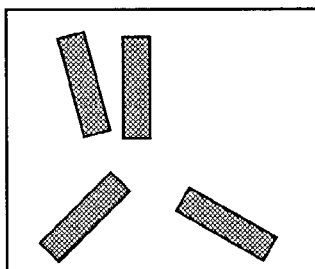
FIG.11A
INPUT IMAGE
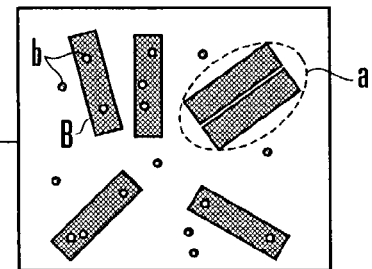
GENERATION OF DETERMINATION IMAGE
COMBINING
FIG.11D
COMPOSITE IMAGE #1
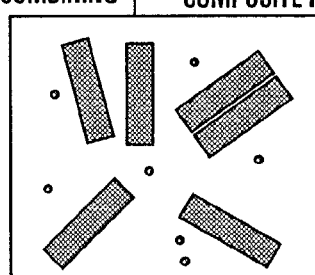
FIG.11C
PRE-PROCESSED IMAGE
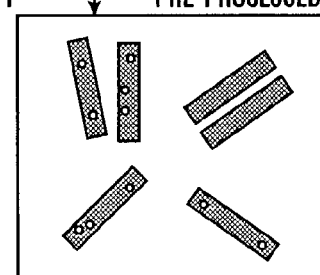
COMBINING
FIG.11E
COMPOSITE IMAGE #2
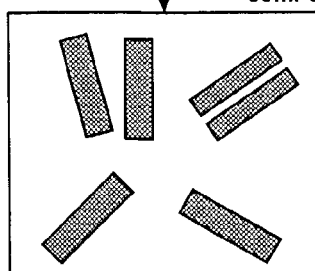

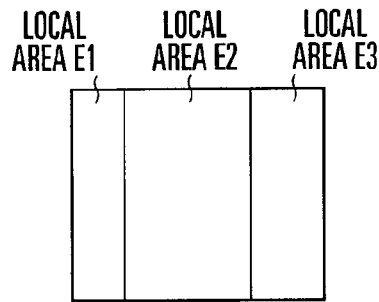
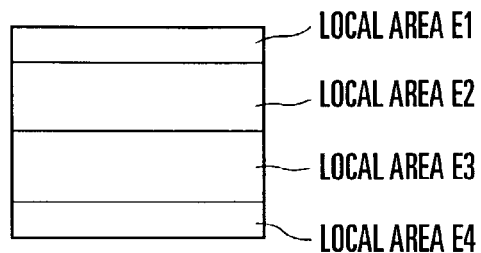
FIG.16A    FIG.16B
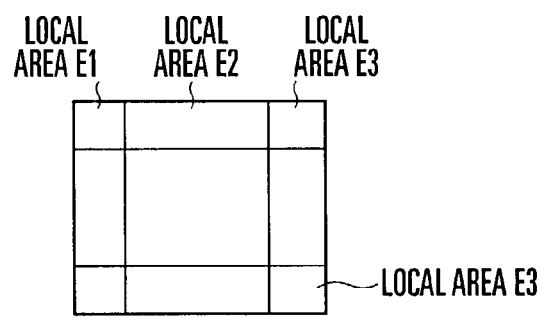
FIG.16C
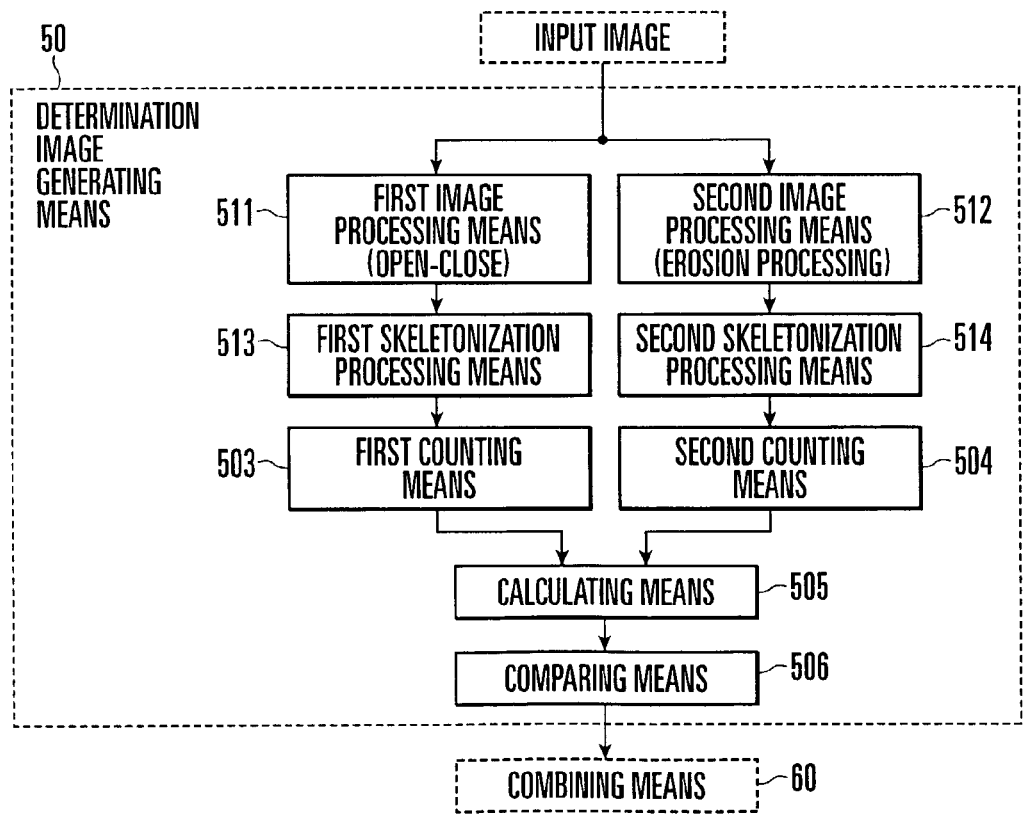
FIG.17

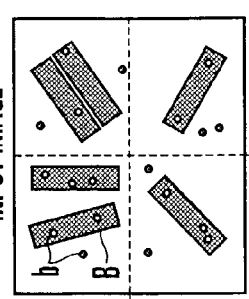
FIG.18A
INPUT IMAGE
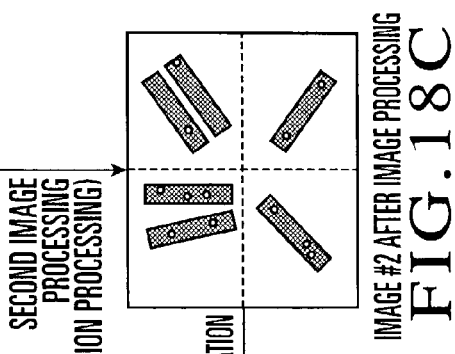
FIG.18C
IMAGE #2 AFTER IMAGE PROCESSING
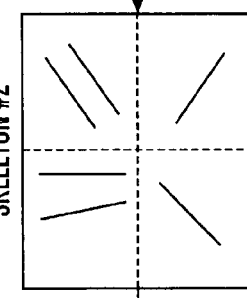
FIG.18E
SKELETON #2
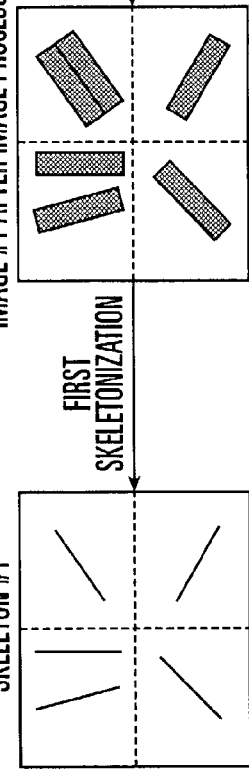
FIG.18B
IMAGE #1 AFTER IMAGE PROCESSING
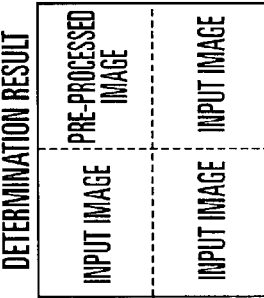
FIG.18G
COUNT RESULT #2
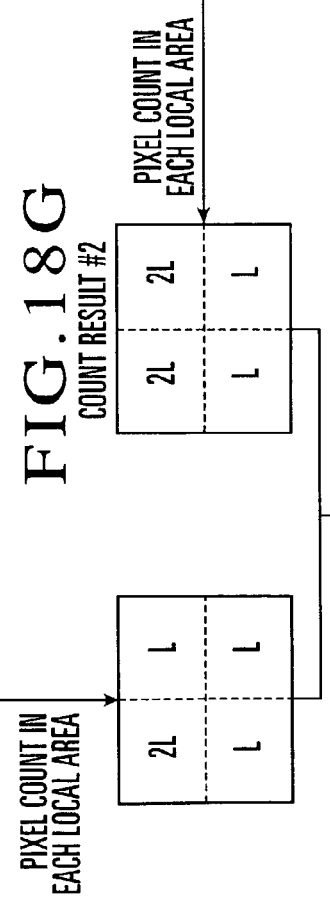
FIG.18D
SKELETON #1
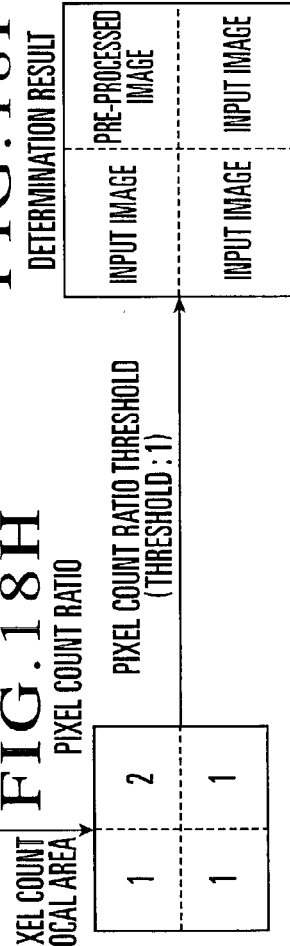
FIG.18H
PIXEL COUNT RATIO
FIG.18F
COUNT RESULT #1
FIG.18I
DETERMINATION RESULT

INPUT IMAGE

IMAGE AFTER IMAGE PROCESSING

SKELETON

DETERMINATION IMAGE #1

DETERMINATION IMAGE #2

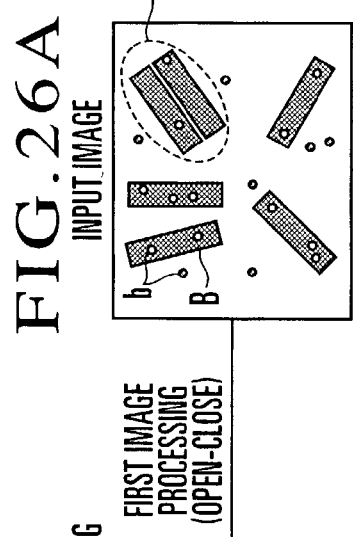
FIG.26A
INPUT IMAGE
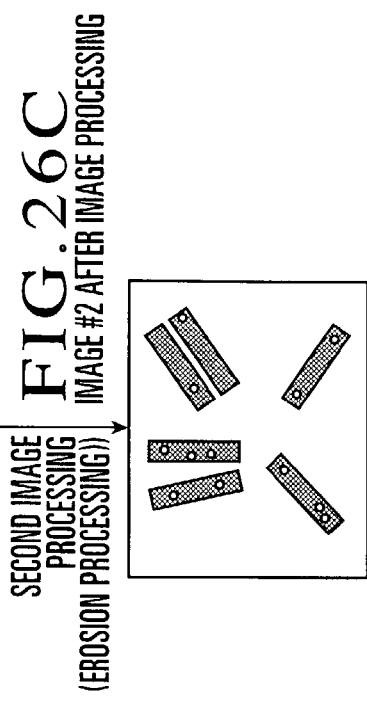
FIG.26C
IMAGE #2 AFTER IMAGE PROCESSING
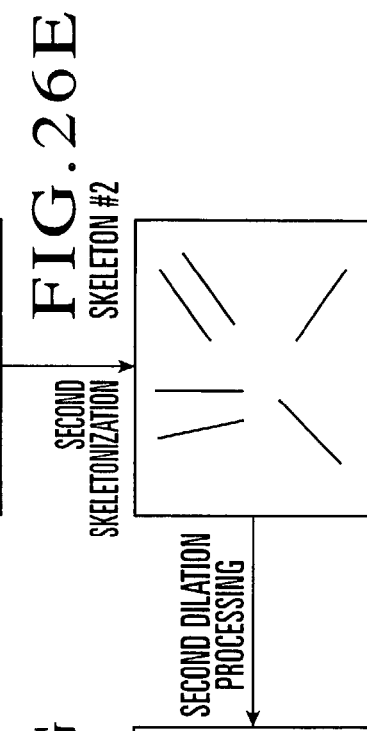
FIG.26E
SKELETON #2
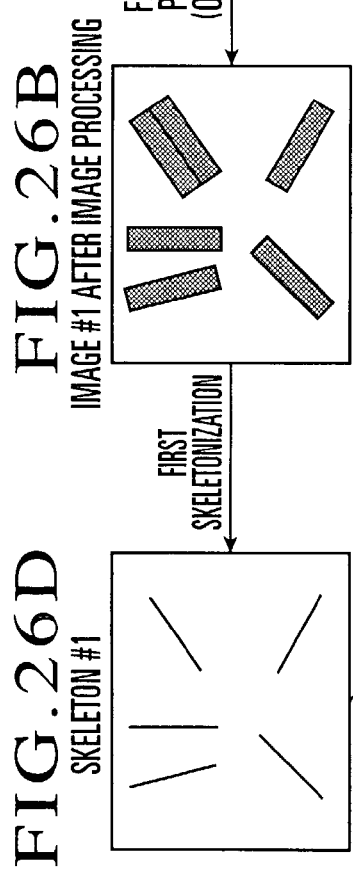
FIG.26B
IMAGE #1 AFTER IMAGE PROCESSING
FIG.26D
SKELETON #1
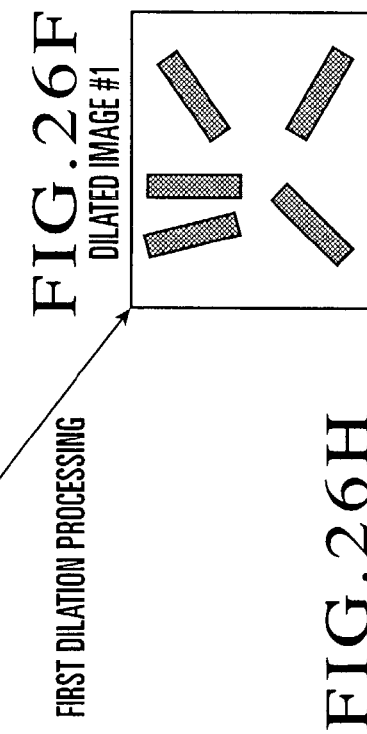
FIG.26F
DILATED IMAGE #1
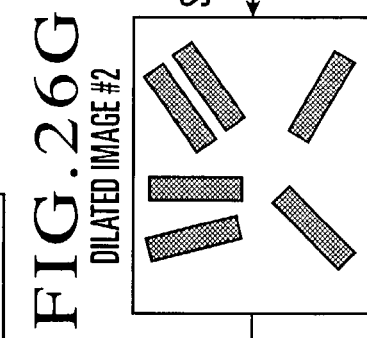
FIG.26G
DILATED IMAGE #2
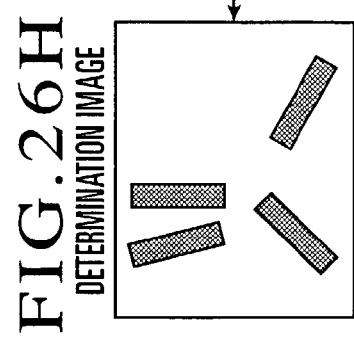
FIG.26H
DETERMINATION IMAGE

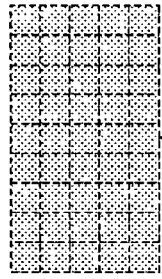

FIG.28A

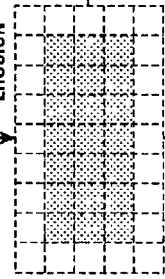

FIG.28B → EROSION → 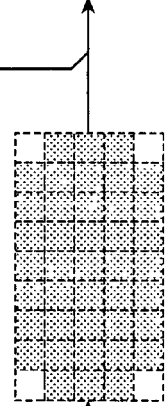 → DILATION → FIG.28C → SUBTRACTION → FIG.28D S0 (n=0) → UNION → FIG.28E SK0 (n=0)

FIG.28F → EROSION → FIG.28G → DILATION → FIG.28H S1 (n=1) → UNION → FIG.28I SK1 (n=1)

FIG.28J → EROSION → FIG.28K → DILATION → FIG.28L S2 (n=2) → UNION → FIG.28M SK2 (n=2)

(NOTE)
- IF REPETITION COUNT n IS 1, SKELETON OF OBJECT HAVING WIDTH CORRESPONDING TO FIVE PIXELS IS NOT DETECTED (FIG.28I)
- IF REPETITION COUNT n IS 2, SKELETON OF OBJECT HAVING WIDTH CORRESPONDING TO FIVE PIXELS IS DETECTED (FIG.28M)

IMAGE PROCESSING METHOD AND APPARATUS

BACKGROUND OF THE INVENTION

The present invention relates to an image processing apparatus which can reproduce, from an input image in which noise exists, the intrinsic structure of a sensed object included in the input image and, more specifically, to an image processing apparatus which performs image processing required for pre-processing for the recognition of each of a plurality of sensed objects included in one image, personal authentication using fingerprints and irises, and the like.

In general, noise is removed from an image by using the differences in luminance value between a noise pixel and neighboring pixels in consideration of the fact that the noise pixel solely has a luminance value different from those of the neighboring pixels. The smoothing filter method is a typical method of removing such isolated points from a background image and filling holes (isolated points) in a graphic pattern (object image). In this method, the average luminance value of 3×3 neighboring pixels around a pixel of interest is set as the luminance value of the pixel of interest. The method, however, has the drawback of blurring even edges. A method using a median filter which set, as the luminance value of a pixel of interest, the median value of the luminance values of 3×3 neighboring pixels around the pixel of interest is available as a method of removing noise without blurring edges (T. S. Huang, G. J. Yang, and G. Y. Tang, "A fast two-dimensional median filtering algorithm", PRIP' 78, pp. 121–131, 1978).

There is a method of removing point noise from a background image or holes from an object image by performing erosion processing and dilation processing, which are functions of Morphology, with respect to an image object. A method of removing noise by repeating this processing is also available (J. Serra, "Image Analysis and Mathematical Morphology," Academic Press, London, 1982, and P. Maragos, "Tutorial on advances in morphological image processing and analysis", Opt, Eng., 26, 1987).

According to this method, letting X be an image to be processed and B be a structuring element, when (X+B) is defined as dilation of X by B and (X−B) is defined as erosion of X by B, opening and closing are defined by equations (1) and (2), respectively. Noise is removed by repeatedly performing opening and closing.

$$XoB=(X-B)+B \qquad (1)$$

$$X \cdot B=(X+B)-B \qquad (2)$$

Assume that in erosion processing, a pixel group obtained by shifting an image in several directions on a pixel basis is overlaid on the original pixels, and the logical AND (the minimum value in the case of a halftone image) of the luminance values between these pixels is calculated, whereas in dilation processing, the logical OR (the maximum value in the case of a halftone image) of the luminance values between these pixels is calculated. In this case, when opening processing in which dilation processing is performed after erosion processing and closing processing in which erosion processing is performed after dilation processing are consecutively performed, fine noise is removed by the opening processing first, and then holes (noise) in an object image can be filled by the closing processing.

There is another example of the method of repeating erosion processing and dilation processing (R. M. Haralick, S. R. Sternber and X. Zhuang, "Image Analysis Using Mathematical Morphology", IEEE Transactions on Pattern Analysis and Machine Intelligence, vol. PAMI-9, no. 4, pp. 532–550, July 1987).

In the above method (to be referred to as the first conventional method), high-speed processing can be done by using parallel hardware on a relatively small scale. However, disconnection or connection locally occurs in a processed object image, resulting in the failure of the reproduction of the structure of the object.

As a method (to be referred to as the second conventional method) of improving this, an image processing method based on the consideration of the structure of a sensed object is available. One of such methods is a noise removing method based on the edge directions of an object (M. Nagao and T. Mtusyama, "Edge preserving smoothing", CGIP, vol. 9, pp. 394–407, April 1979). In this method, consideration is given to edge directions in such a manner that in the area of neighboring 5×5 pixels around a pixel of interest, the edge directions of an object are classified according to nine different window patterns, the variances of luminance values in the respective patterns are then obtained, and the average luminance value in the pattern exhibiting the minimum variance is set as the luminance value of the pixel of interest.

In addition, as a method specialized for an object to be sensed, the Mehtre method (B. M. Mehtre, "Fingerprint Image Analysis for Automatic Identification", Machine Vision and Applications, vol. 6, no. 2–3, pp. 124–139, 1993) is available, which is a registration image forming algorithm in fingerprint authentication. In this method, the ridge direction of a fingerprint is obtained, and a cotextual filter is convoluted to emphasize the ridge. In the above second conventional method, the structure of an object (a ridge of a fingerprint in the latter case) in a processed image is robust. However, complicated filter processing using pixel information in a relatively large area is required, and hence the processing amount is large. This makes it difficult to realize high-speed, high-precision processing by using an inexpensive, simple apparatus.

SUMMARY OF THE INVENTION

The present invention has been made in consideration of the above problems, and has as its object to realize high-speed, high-precision processing using an inexpensive, simple apparatus by solving the problem that the structure of a sensed object is locally destroyed as in the above first conventional method and obviating the necessity to perform filter processing using pixel information in a relatively large area as in the second conventional method, thereby providing accurate images for the recognition of sensed objects, personal authentication using fingerprints and irises, and the like.

In order to achieve the above object, according to the present invention, there is provided an image processing apparatus comprising image correcting means for, when an image of an object is input, performing correction processing for an input image including the object image and outputting the corrected image as an image required for authentication of the object.

BRIEF DESCRIPTION OF THE DRAWINGS

FIGS. 2A to 2E are views for explaining image processing in the above image processing apparatus;

Figure 6:
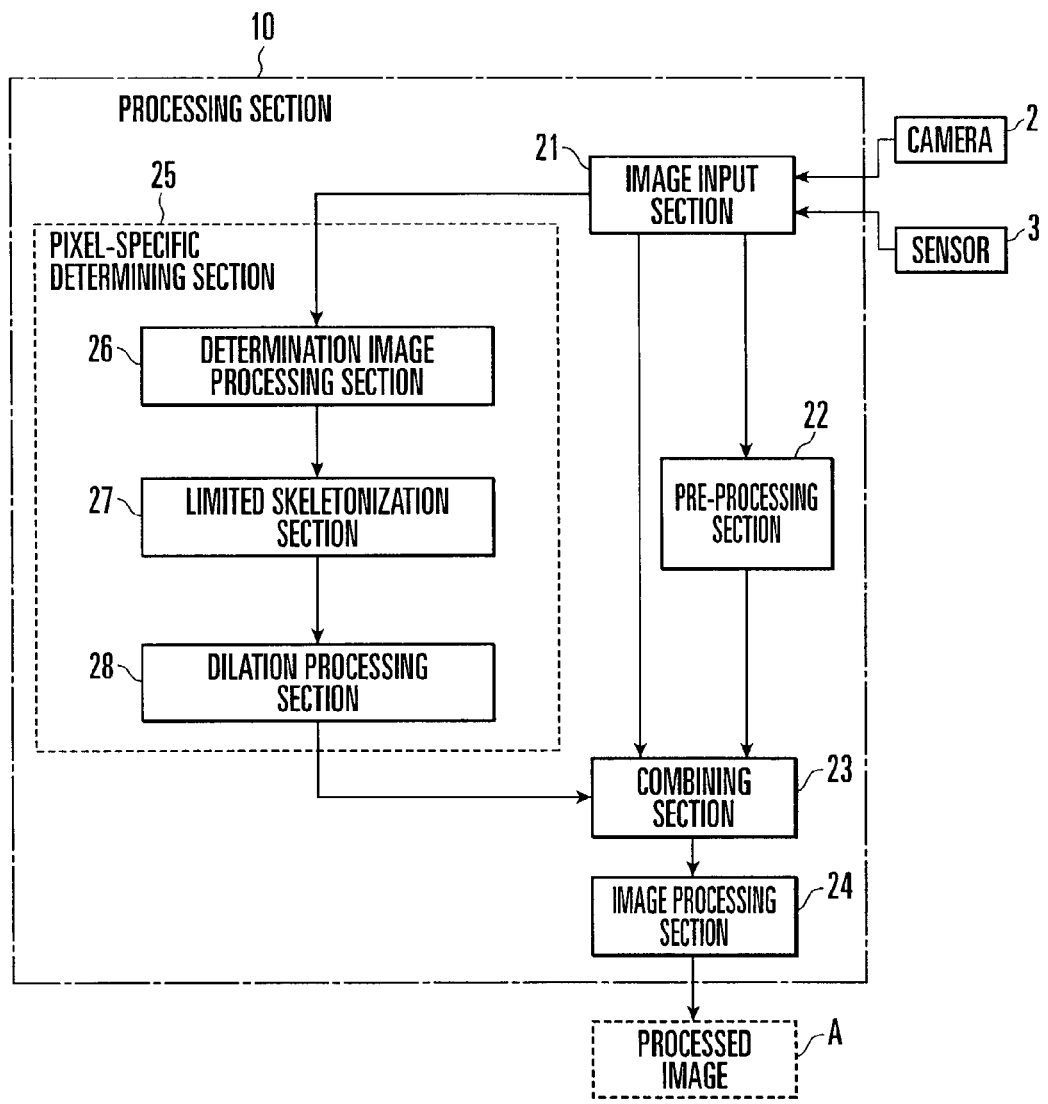
Figure 8:
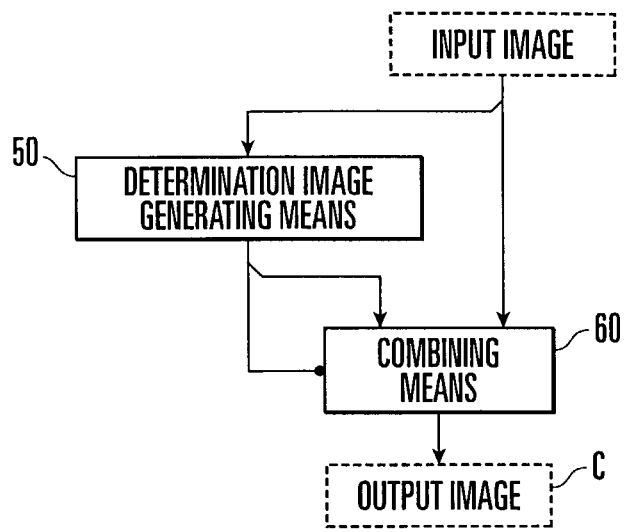
Figures 9A, 9B, 9C:
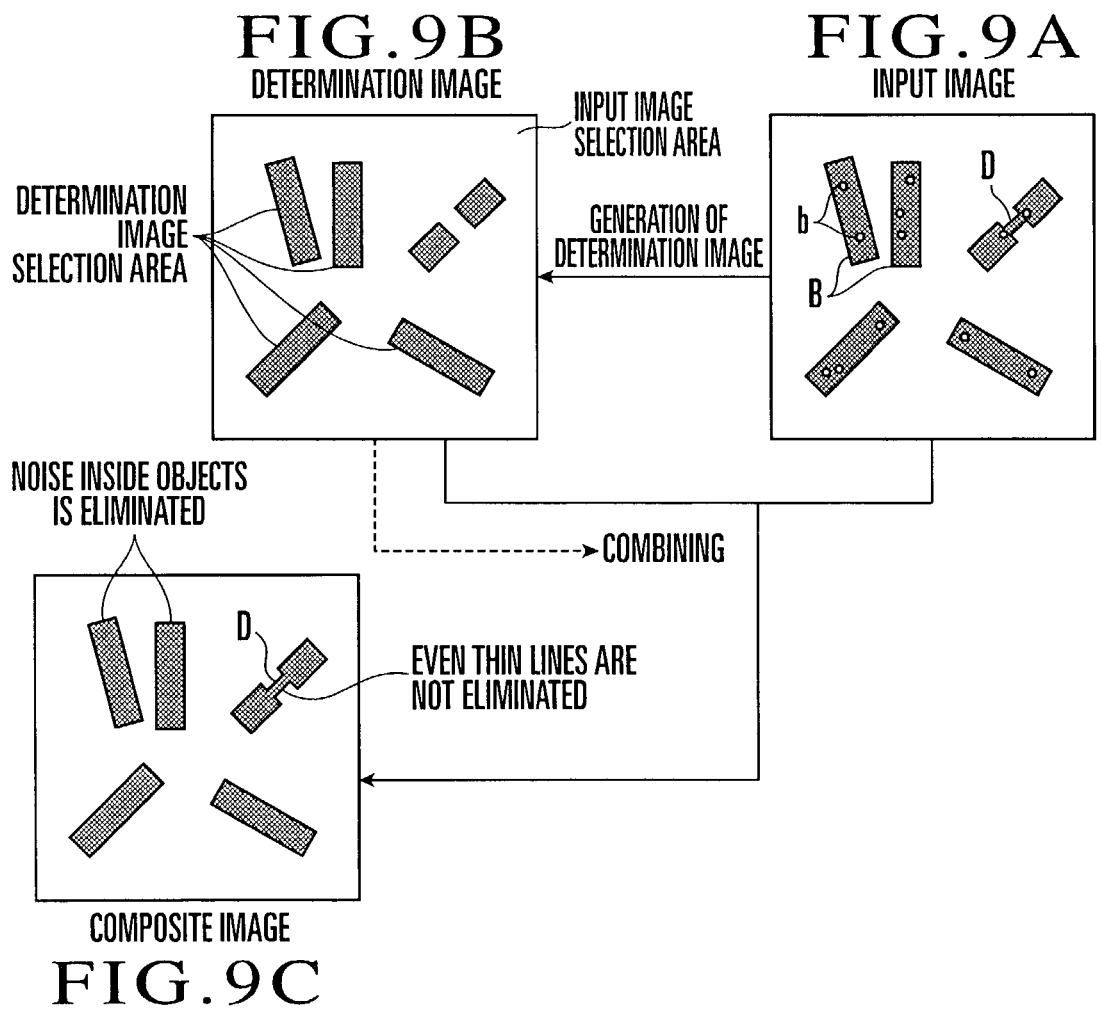
Figure 12:
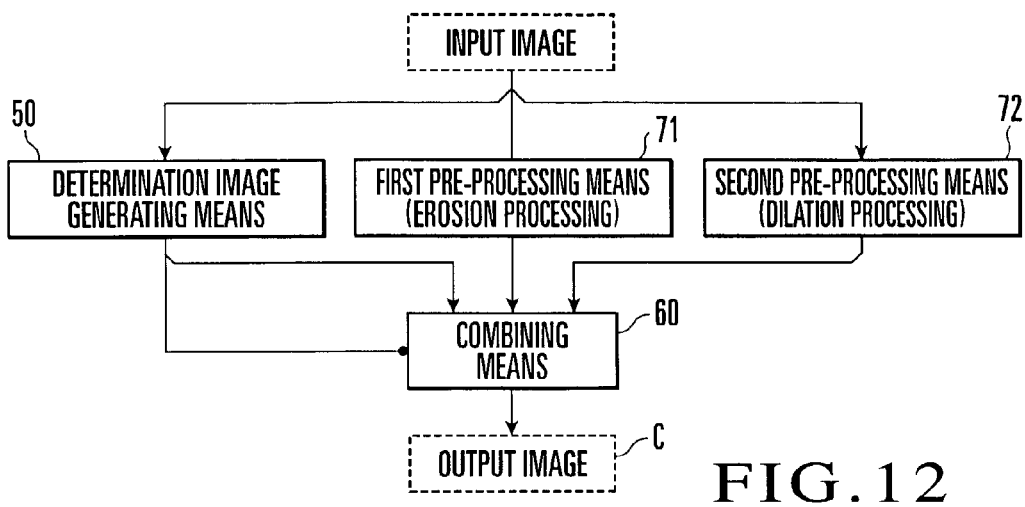
Figure 14:
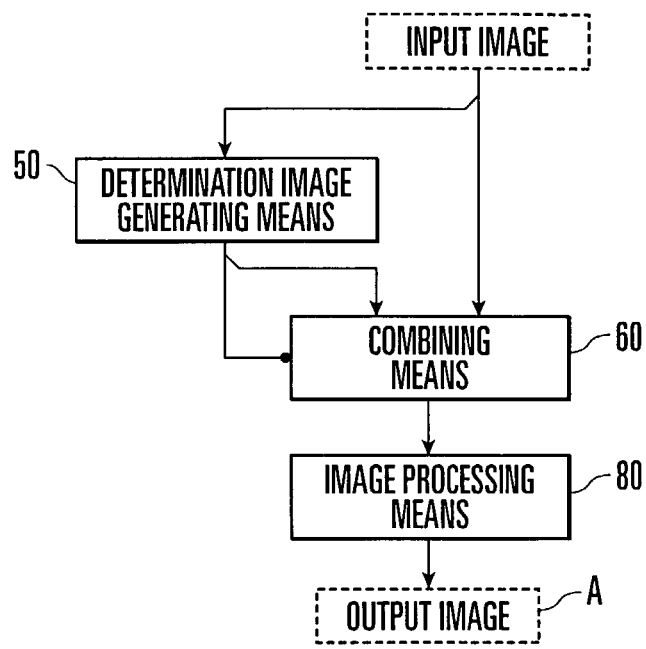
Figure 15:
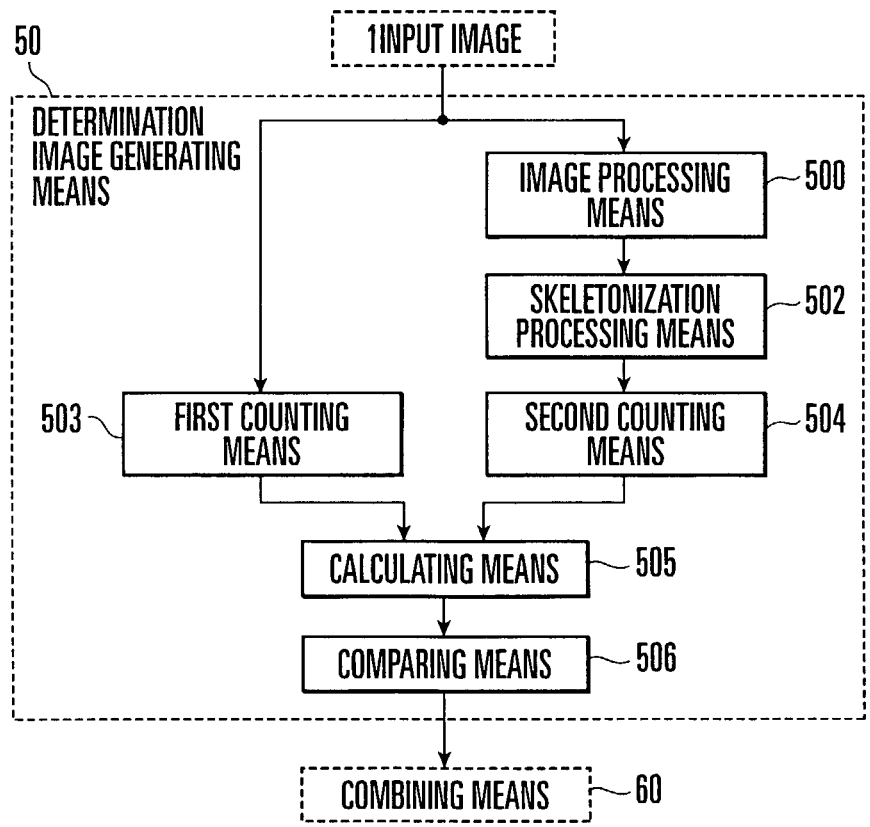
Figure 19:
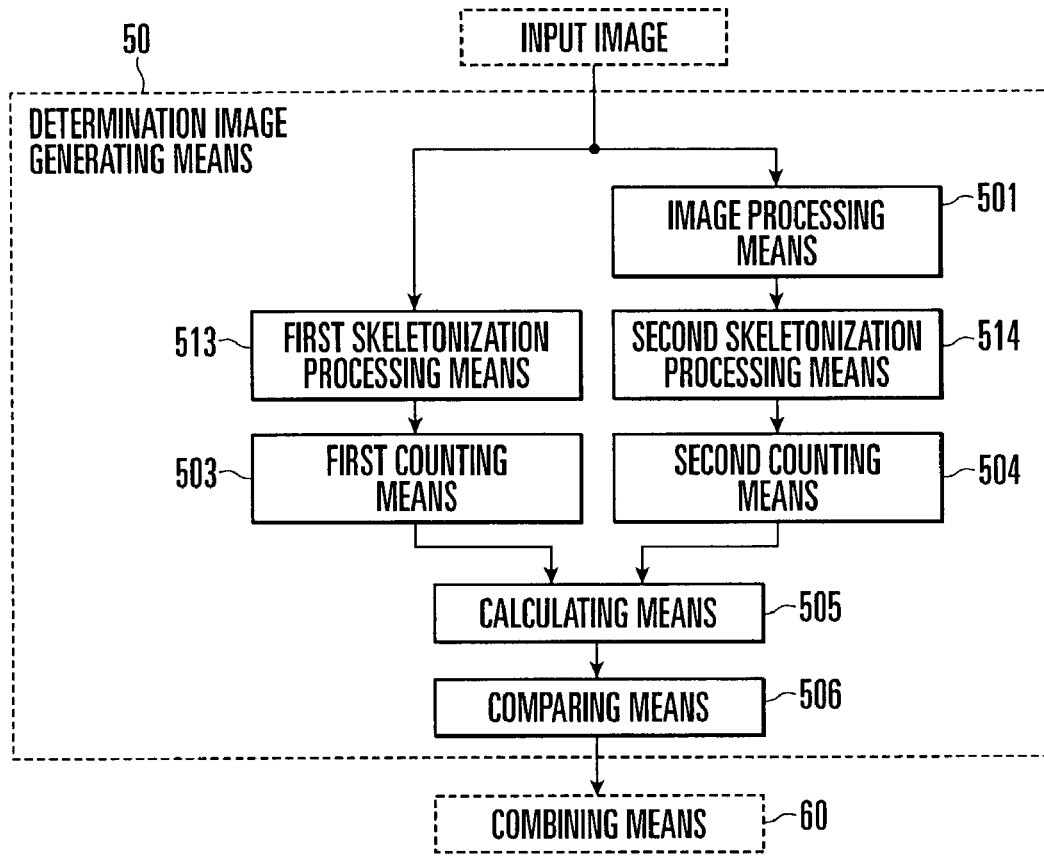
Figure 20:
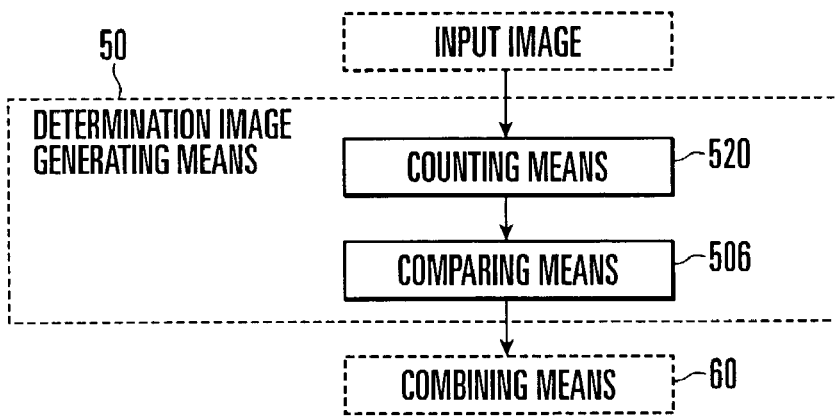
Figure 21:
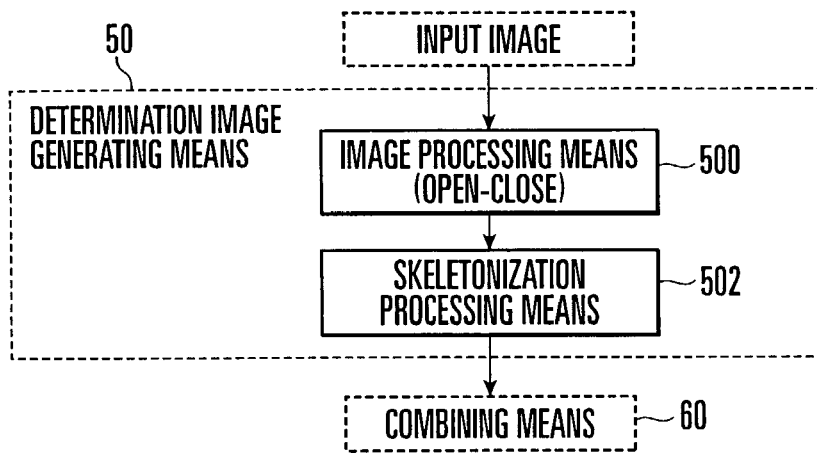
Figure 22:
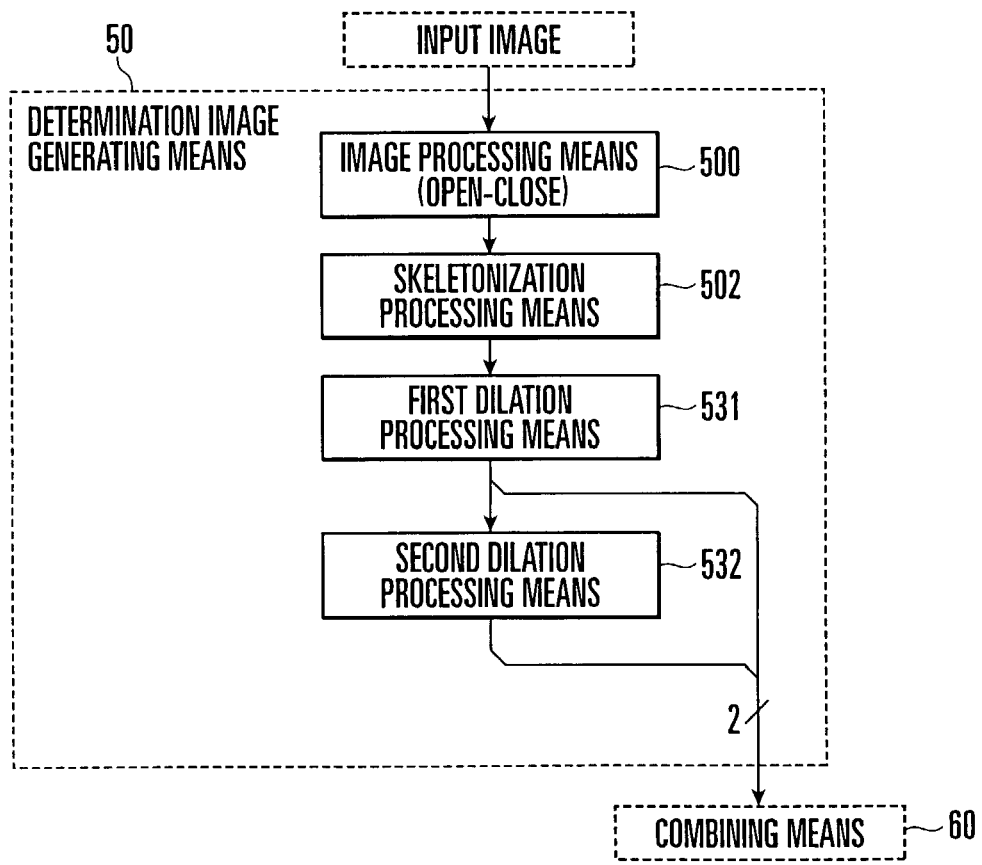
Figure 24:
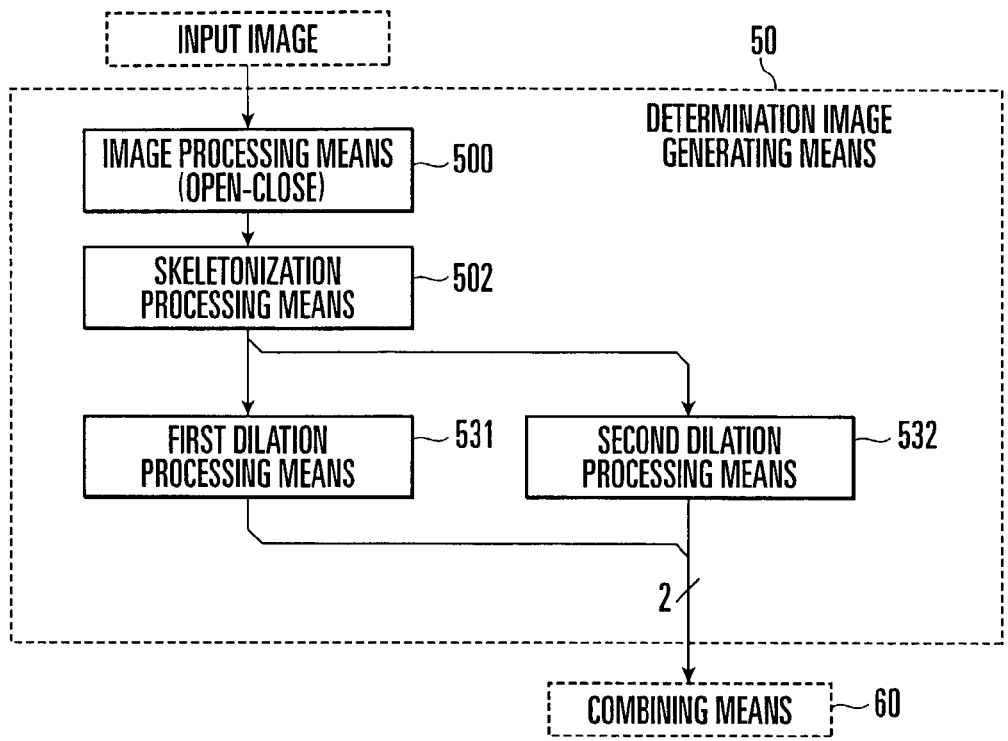
Figure 25:
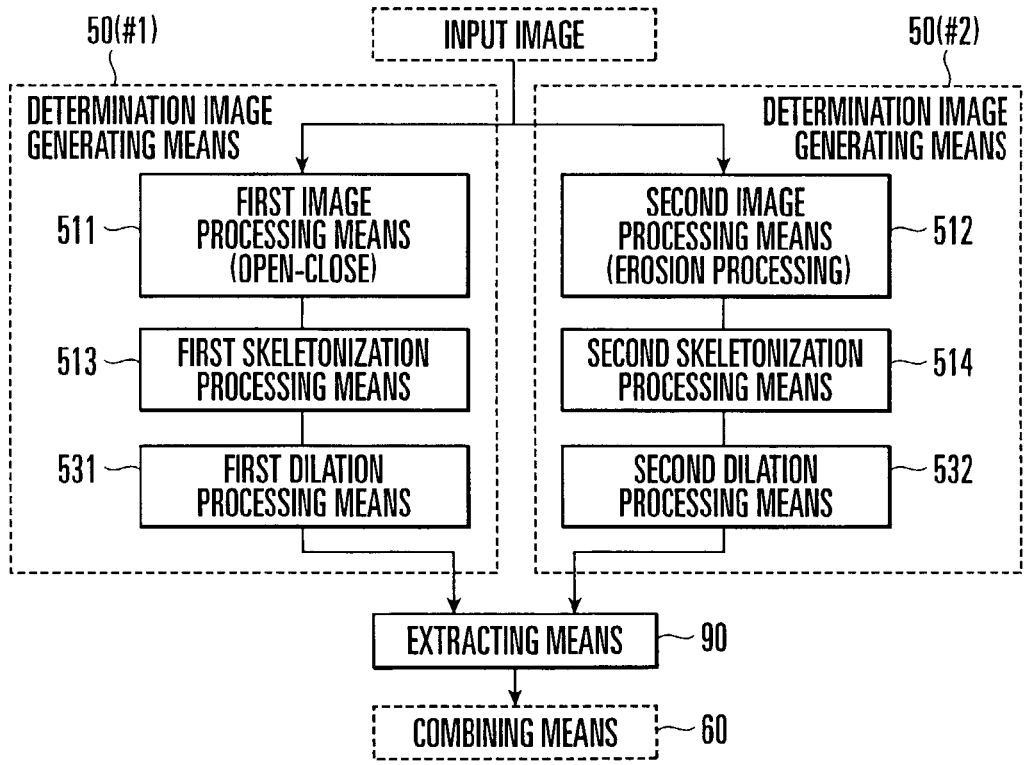
Figure 27:
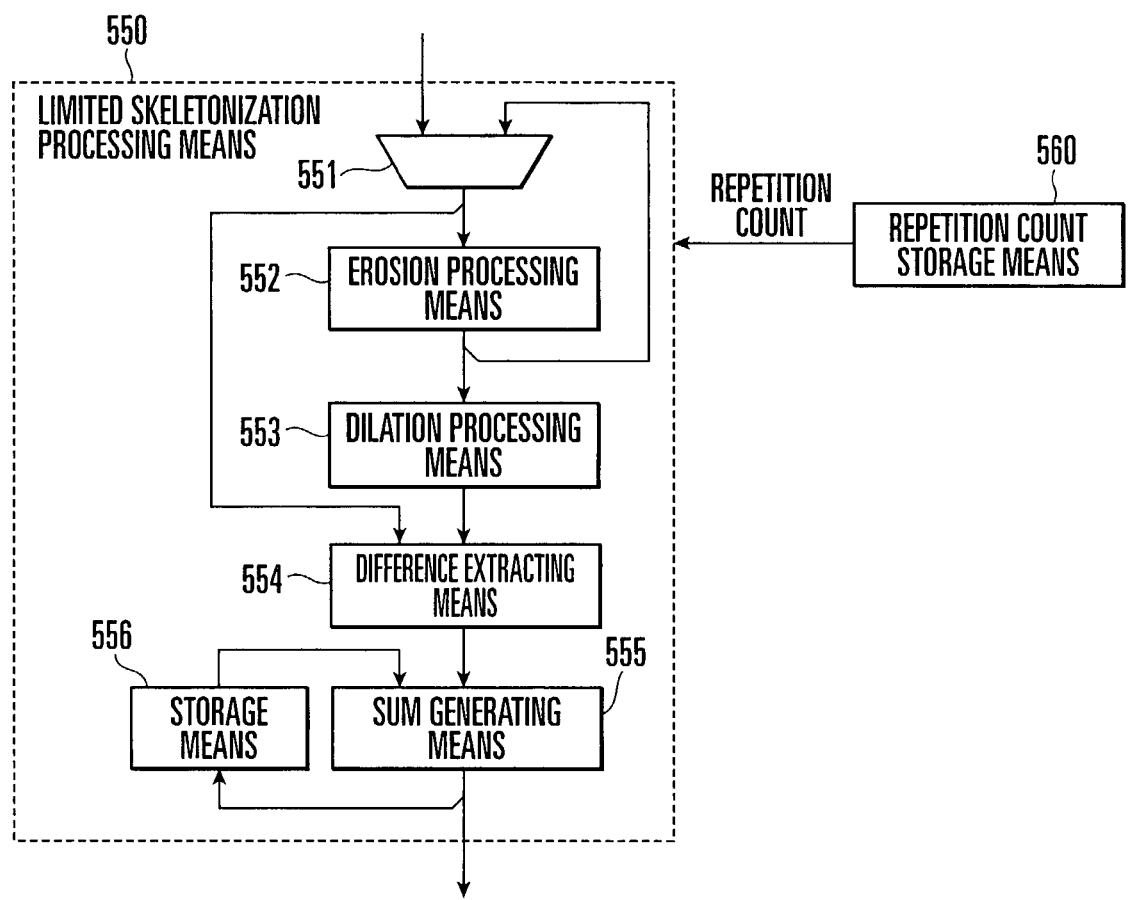
Figure 29:
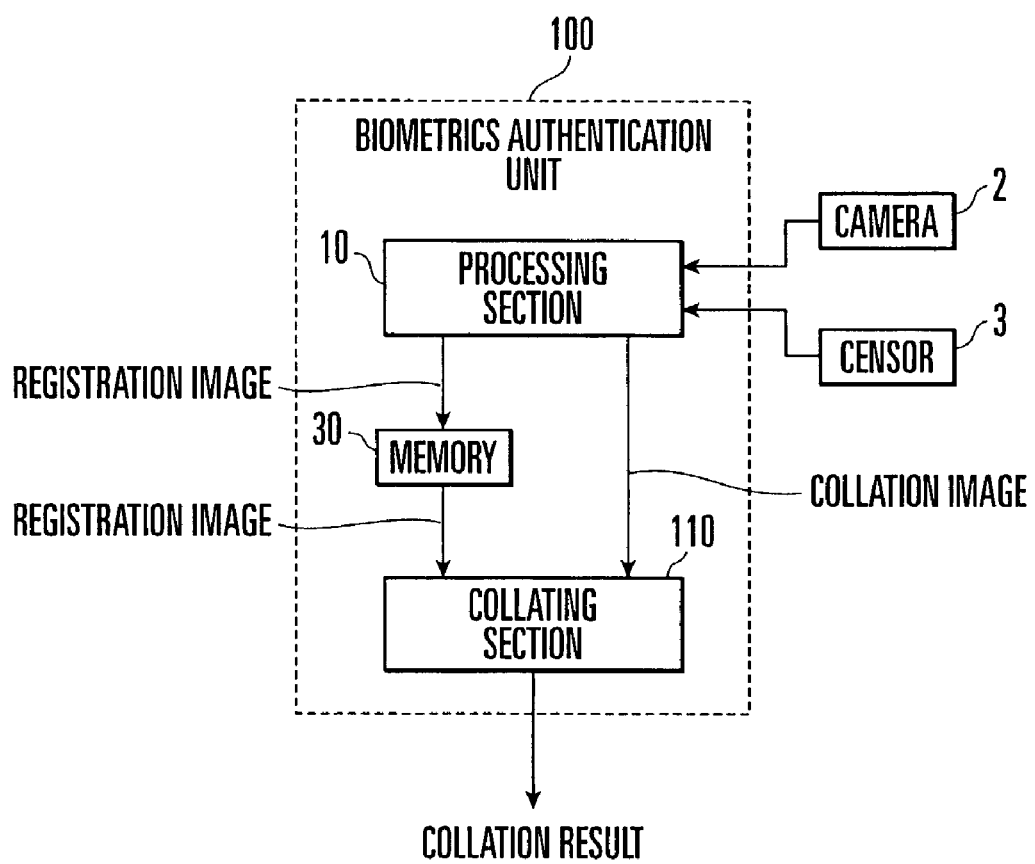

4A to 4D are views for explaining how an image area to be processed by the above image processing apparatus is segmented;

FIGS. 5A to 5G are views for explaining the main part of image processing in the above image processing apparatus;

FIG. 6 is a block diagram showing an image processing apparatus according to the second embodiment;

FIGS. 7A to 7G are views for explaining image processing in the above image processing apparatus;

FIG. 8 is a block diagram showing an image processing apparatus according to the third embodiment;

FIGS. 9A to 9C are views for explaining image processing in the image processing apparatus in FIG. 8;

FIG. 10 is a block diagram showing an image processing apparatus according to the fourth embodiment;

FIGS. 11A to 11E are views for explaining image processing in the image processing apparatus in FIG. 10;

FIG. 12 is a block diagram showing an image processing apparatus according to the fifth embodiment;

FIGS. 13A to 13E are views for explaining image processing in the image processing apparatus in FIG. 12;

FIG. 14 is a block diagram showing an image processing apparatus according to the sixth embodiment;

FIG. 15 is a block diagram showing an image processing apparatus according to the seventh embodiment;

FIGS. 16A to 16C are views for explaining image processing in the image processing apparatus in FIG. 15;

FIG. 17 is a block diagram showing an image processing apparatus according to the eighth embodiment;

FIGS. 18A to 18I are views for explaining image processing in the image processing apparatus in FIG. 17;

FIG. 19 is a block diagram showing an image processing apparatus according to the ninth embodiment;

FIG. 20 is a block diagram showing an image processing apparatus according to the 10th embodiment;

FIG. 21 is a block diagram showing an image processing apparatus according to the 11th embodiment;

FIG. 22 is a block diagram showing an image processing apparatus according to the 12th embodiment;

FIGS. 23A to 23E are views for explaining image processing in the image processing apparatus in FIG. 22;

FIG. 24 is a block diagram showing an image processing apparatus according to the 13th embodiment;

FIG. 25 is a block diagram showing an image processing apparatus according to the 14th embodiment;

FIGS. 26A to 26H are views for explaining image processing in the image processing apparatus in FIG. 25;

FIG. 27 is a block diagram showing an image processing apparatus according to the 15th embodiment;

FIGS. 28A to 28M are views for explaining image processing in the image processing apparatus in FIG. 27; and FIG. 29 is a block diagram showing an image processing apparatus according to the 16th embodiment.

DESCRIPTION OF THE PREFERRED EMBODIMENTS

The present invention will be described below with reference to the accompanying drawings.

First Embodiment

Figure 1A:
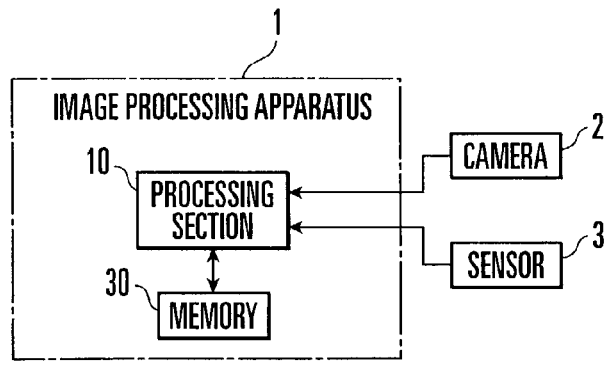
FIGS. 1A and 1B are block diagrams showing an image processing apparatus according to the first embodiment of the present invention.

FIG. 1A shows an image processing apparatus according to the first embodiment of the present invention. This image processing apparatus 1 is comprised of a processing section 10 for receiving the object image taken by a camera 2 and the object image including a fingerprint or iris image detected by a sensor 3 and performs image processing for them, and a memory 30 which stores the input image or the image processed by the processing section 10.

Figure 1B:
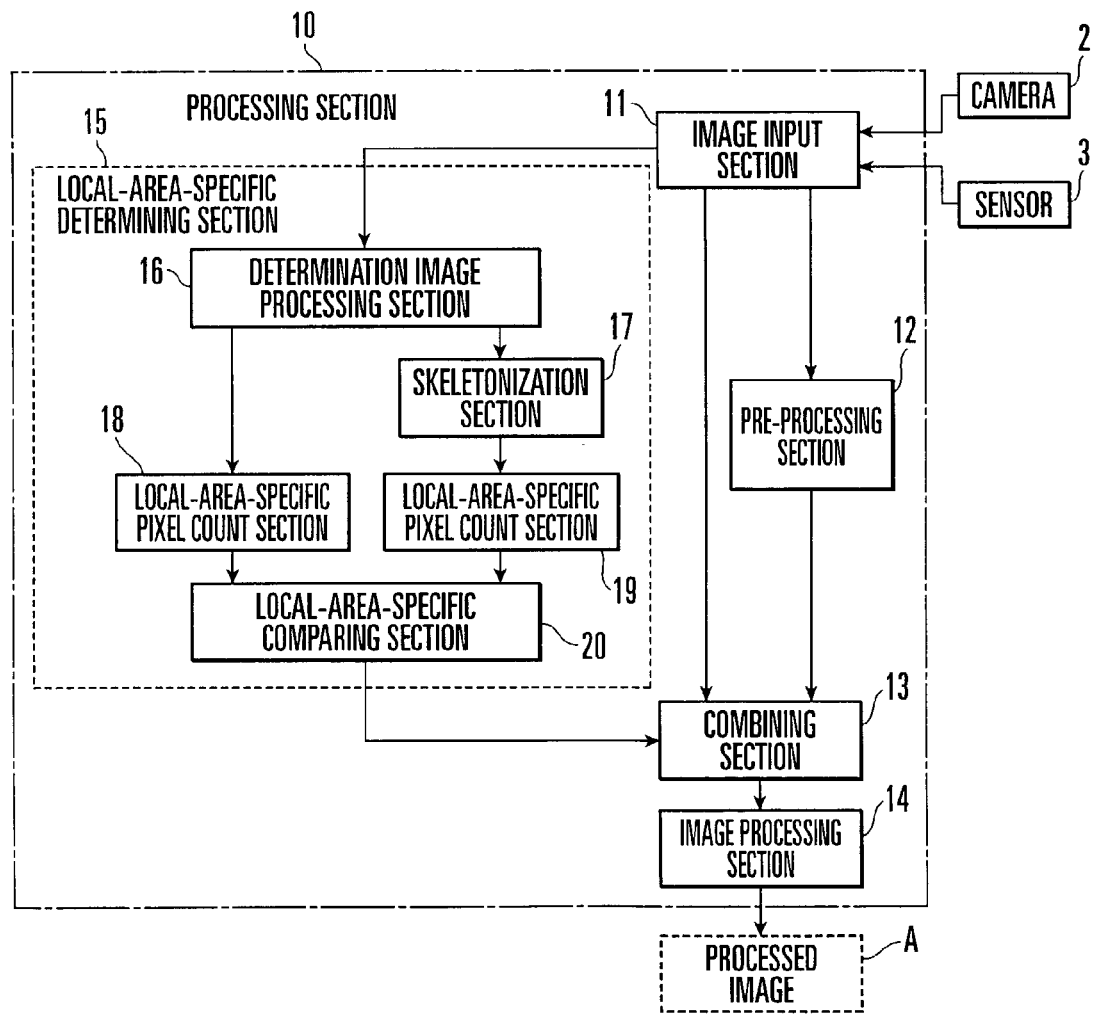

FIG. 1B shows the arrangement of the processing section 10. As shown in FIG. 1B, the processing section 10 is comprised of an image input section 11 for capturing the object image taken by the camera 2 or the object image detected by the sensor 3, a pre-processing section 12 for performing pre-processing (to be described later) upon receiving the image captured by the image input section 11, a combining section 13 for selectively receiving the input image input by the image input section 11 and the image processed by the pre-processing section 12 and combining them to output the resultant image as a composite image, an image processing section 14 for processing the composite image obtained by the combining section 13 and outputting the resultant image as a processed image A, and a local-area-specific determining section 15 for processing the input image from the image input section 11 and determining the image to be selected by the combining section 13.

In this case, the local-area-specific determining section 15 is comprised of a determination image processing section 16 for receiving the input image from the image input section 11 and processing the input image as a determination image, a skeletonization section 17 for performing skeletonization processing to obtain the central line of the process image from the determination image processing section 16, a local-area-specific pixel count section 18 for counting the number of pixels of the image processed by the determination image processing section 16 for each of local areas segmented in advance, a local-area-specific pixel count section 19 for counting the number of pixels of the image subjected to skeletonization processing by the skeletonization section 17, and a local-area-specific comparing section 20 for comparing the count values respectively counted by the local-area-specific pixel count sections 18 and 19 for each local area, determining in accordance with the comparison result whether to select an image of the corresponding local area from the input image or the image processed by the pre-processing section 12, and outputting the determination result to the combining section 13.

FIGS. 2A to 2E shows the process image processed by the image processing apparatus 1 in FIGS. 1A and 1B. Image processing in the image processing apparatus 1 will be described with reference to FIGS. 2A to 2E and 1A and 1B.

Figure 3:
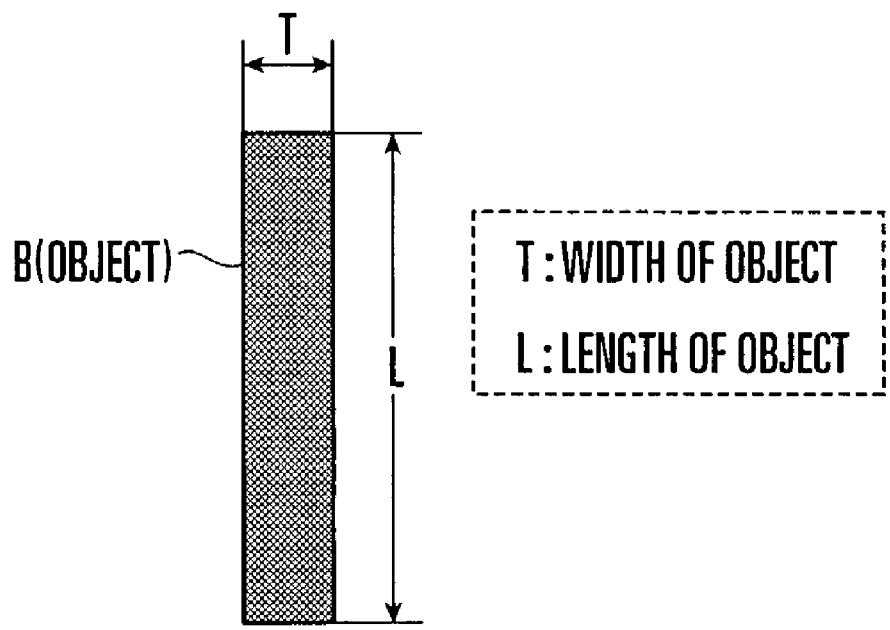
FIG. 3 is a view for explaining the width and length of a sensed object to be processed by the above image processing apparatus.

For example, as shown in FIG. 2A, the input image taken by the camera 2 and captured by the image input section 11 is input as an image including a sensed object B and noise components b, other than the sensed object B, which are randomly superimposed on the inner part of the sensed object B and the background portion therearound. FIG. 2A shows a case wherein a plurality of objects are photographed. One sensed object B is an aggregate of pixels, and has a width T and length L, as shown in FIG. 3.

In this case, in order to prevent the occurrence of connection or disconnection on an object image after image processing, the pre-processing section 12 in FIGS. 1A and 1B performs erosion (erosion processing) of overlaying, for example, the pixel group, obtained by shifting an input image in the horizontal and vertical directions on a pixel basis, on the original pixels and calculating the logical AND (the logical AND in the case of binary display; the minimum value in the case of gradation display (halftone display)) of the luminance. The state shown in FIG. 2B shows the result of this erosion processing, in which the noise components b around the sensed object B are removed. For this pre-processing, one of various methods described with reference to the first conventional method may be used solely or a combination of some of them may be used. More specifically, as pre-processing, instead of erosion processing, the above dilation processing may be performed in which the pixel group obtained by shifting an input image in the horizontal and vertical directions on a pixel basis is overlaid on the pixels of the original input image, and the logical OR (the logical OR in the case of binary display; the maximum value in the case of gradation display (halftone display)) of the luminance values between these pixels, or the above smoothing processing may be performed.

As described above, the local-area-specific determining section 15 in FIGS. 1A and 1B determines whether to select a pre-processed image or input image for each local area so as to form a composite image. In this case, the local areas are the areas obtained by segmenting an image by various methods. FIGS. 4A to 4D show examples. An image may be segmented into several areas in the vertical or horizontal direction, as shown in FIGS. 4A and 4B, or may be segmented into a plurality of blocks, as shown in FIGS. 4C and 4D. As a simple example, the case wherein an image is segmented into four blocks (i.e., local areas E1 to E4) as shown in FIG. 4C will be described below.

Assume that as the determination results obtained by the local-area-specific determining section 15, selection of input images is determined in local areas E1, E3 and E4, and selection of a pre-processed image is determined in a local area E2, as shown in FIG. 2C. In this case, the combining section 13 selects input images in the local areas E1, E3, and E4, and selects a pre-processed image in the local area E2. The combining section 13 then combines the selected images to generate a composite image like the one shown in FIG. 2D. The composite image generated by the combining section 13 is then consecutively subjected to, for example, the above opening processing and closing processing, which are noise removal processing, described with reference to the first conventional method, based on morphological operation in the image processing section 14. As a result, the noise components b are removed from the image, thus outputting the processed image as shown in FIG. 2E.

That is, the first embodiment performs erosion processing in which the pixel group obtained by shifting an input image in the horizontal and vertical directions on a pixel basis is overlaid on the pixels of the original input image, and the minimum value of the luminance values between these pixels is computed and dilation processing in which the maximum value of the luminance values between the overlaid pixels is computed. In this case, the image processing section 14 consecutively performs opening processing (first image processing) of performing dilation processing (second image processing) after erosion processing and closing processing of performing erosion processing after dilation processing, thereby outputting the processed image A from which the noise components b are removed.

FIGS. 5A to 5G are views for explaining determination processing in the local-area-specific determining section 15. The main operation of image processing in this image processing apparatus will be described in detail with reference to FIGS. 5A to 5G. First of all, the determination image processing section 16 performs, for example, the above opening processing and closing processing, which are noise removal processing based on the above morphological operation, with respect to the input image shown in FIG. 5A. For this determination image processing, one of various methods described with reference to the first conventional method may be used solely or a combination of several methods thereof may be used.

The noise components b are removed from the image processed by determination image processing section 16, as shown in FIG. 5B. However, two adjacent sensed objects B, like two sensed objects B existing in the local area E2, adhere to each other to become one sensed object.

Subsequently, the local-area-specific pixel count section 18 counts the number of pixels whose luminance values fall within a predetermined range with respect to the image processed by the determination image processing section 16 on a local area basis. In this case, the predetermined range is defined by the luminance values of the pixels constituting the sensed object B, and the number of pixels whose luminance values fall within the predetermined range is counted. As shown in FIG. 5D, the count results are 2LT in both the local areas E1 and E2, and LT in both the local areas E3 and E4. In this case, T represents the number of pixels of the sensed object B in the widthwise direction, and L represents the number of pixels of the sensed object B in the longitudinal direction.

The skeletonization section 17 in FIGS. 1A and 1B skeletonizes the image processed by the determination image processing section 16 and shown in FIG. 5B by, for example, a method using morphology (Petros A. Maragos and Ronald W. Schafer, "Morphological Skelton Representation and Coding of Binary Image", IEEE Transactions on Acoustics, Speech, and Signal Processing, vol. ASSP-34, no. 5, pp. 1228–1244, October 1986). As described above, this skeletonization processing is the processing of obtaining the central lines of the sensed objects B. In the image processed by the determination image processing section 16 and shown in FIG. 5B, the two sensed objects B exist in the local area E1, and one sensed object exists in each of the remaining local areas E2 to E4. Therefore, as the image obtained after skeletonization processing, skeletons including two line segments in the local area E1 and one line segment in each of the remaining local areas E2 to E4 are obtained, as shown in FIG. 5C.

The local-area-specific pixel count section 19 counts the number of pixels whose luminance values fall within the predetermined range with respect to the image after such skeletonization processing on a local area basis. In this case, the predetermined range is defined by the luminance values of the pixels constituting a line segment in an image, and the number of pixels whose luminance values fall within the predetermined range is counted. As shown in FIG. 5E, the count results are 2L in the local area E1, and L in each of the local areas E2, E3, and E4. Note that L represents the number of pixels of the line segment in the longitudinal direction.

The local-area-specific comparing section 20 compares the number of pixels (the number of pixels before skeletonization processing) counted by the local-area-specific pixel count section 18 with the number of pixels (the number of pixels after skeletonization processing) counted by the localarea-specific pixel count section 19. In addition, the local-area-specific comparing section 20 determines whether the ratio between the numbers of pixels respectively counted before and after skeletonization processing is larger than a given value, and outputs the determination result.

Letting N1 be the number of pixels counted in a given local area before skeletonization processing, and N2 be the number of pixels counted after skeletonization processing, N1/N2 is calculated in each local area. In this case, N1 and N2 in the respective local areas E1 to E4 are shown in FIGS. 5D and 5E described above. When, therefore, ratios N1/N2 in the respective areas E1 to E4 are obtained, 2T is obtained in the local area E2, and T is obtained in each of the remaining local areas E1, E3, and E4, as shown in FIG. 5F.

In this case, the local-area-specific comparing section 20 performs computations according to inequalities (3) and (4) with the width T of the sensed object B in FIG. 3 being a threshold:

$$N1/N2 > T \quad (3)$$

$$N1/N2 \leq T \quad (4)$$

With regard to a local area where inequality (3) holds, it is determined that a composite image is generated from the pre-processed image processed by the pre-processing section 12. With regard to a local area where inequality (4) holds, it is determined that a composite image is generated from the input image. The determination results shown in FIG. 5G are then output to the combining section 13.

Note that the values of the right sides of inequalities (3) and (4), i.e., the thresholds T, may be set to various values, e.g., multiples of T, in accordance with the purposes. In addition, in a local area where inequality (3) holds, it may be determined that a composite image is generated from an input image, whereas in a local area wherein inequality (4) holds, it may be determined that a composite image is generated from the pre-processed image processed by the pre-processing section 12.

The combining section 13 generates a composite image from a pre-processed image and an input image on the basis of the determination results which are shown in FIG. 5G and obtained by the local-area-specific comparing section 20. More specifically, as shown in FIG. 2D, the combining section 13 captures the image pre-processed by the pre-processing section 12 in the local area E2 and the input images in the remaining local areas E1, E3, and E4, and combines these captured images.

The image processing section 14 performs, for example, the same image processing as that performed by the determination image processing section 16 or processing using one of various methods, described with reference to the first conventional method, solely or a combination of several methods thereof with respect to the composite image obtained by the combining section 13, and outputs the resultant image as a processed image A, as shown in FIG. 2E.

According to the first conventional method in which uniform processing is performed for an entire frame, when image processing is performed, two adjacent sensed objects B may be connected to each other as in the local area E2 in FIG. 5B, resulting in the destruction of the structure of the sensed object. By performing pre-processing (e.g., erosion processing) for preventing the destruction of a sensed object for only a local area where such destruction of the structure of a sensed object occurs, an image from which noise is removed with high precision can be obtained without performing filter processing using pixel information in a relatively large area as in the second conventional method.

The first embodiment has exemplified the processing of the image taken by the camera 2. However, when, for example, the fingerprint image detected by the sensor 3 is processed, an image from which noise is removed with high precision can be obtained.

As described above, an image from which noise is removed with high precision as compared with the first conventional method can be obtained from an input image in which noise components are scattered without destructing the structure of the sensed object B by performing pre-processing for only a local area that requires it without using filter processing using pixel information in a relatively large area as in the second conventional method.

Second Embodiment

FIG. 6 shows the arrangement of a processing section 10 according to the second embodiment. As shown in FIG. 6, the processing section 10 is comprised of an image input section 21 for capturing the object image taken by a camera 2 or the object image detected by a sensor 3, a pre-processing section 22 for receiving the image captured by the image input section 21 and performing pre-processing for the image, a combining section 23 for selectively receiving the input image input by the image input section 21 and the image processed by the pre-processing section 22, combining them, and outputting the resultant image as a composite image, an image processing section 24 for processing the composite image from the combining section 23 and outputting the resultant image as a processed image A, and a pixel-specific determining section 25 for processing the input image from the image input section 21 and determining the image to be selected by the combining section 23 on the basis of the processing result.

In this case, the pixel-specific determining section 25 is comprised of a determination image processing section 26 for capturing an input image from the image input section 21 and processing the input image as a determination image, a limited skeletonization section 27 for performing skeletonization processing of obtaining the skeleton of the image processed by the determination image processing section 26, and a dilation processing section 28 for performing dilation processing for the image processed by the limited skeletonization section 27 and sending the determination output based on the dilation processing result to the combining section 23, thereby performing control to make the combining section 23 select the input image or the image processed by the pre-processing section 22.

FIGS. 7A to 7G show the process image processed by the image processing apparatus 1 in FIG. 6. Image processing in the image processing apparatus 1 will be described with reference to FIGS. 7A to 7G and 6.

Figure 7:
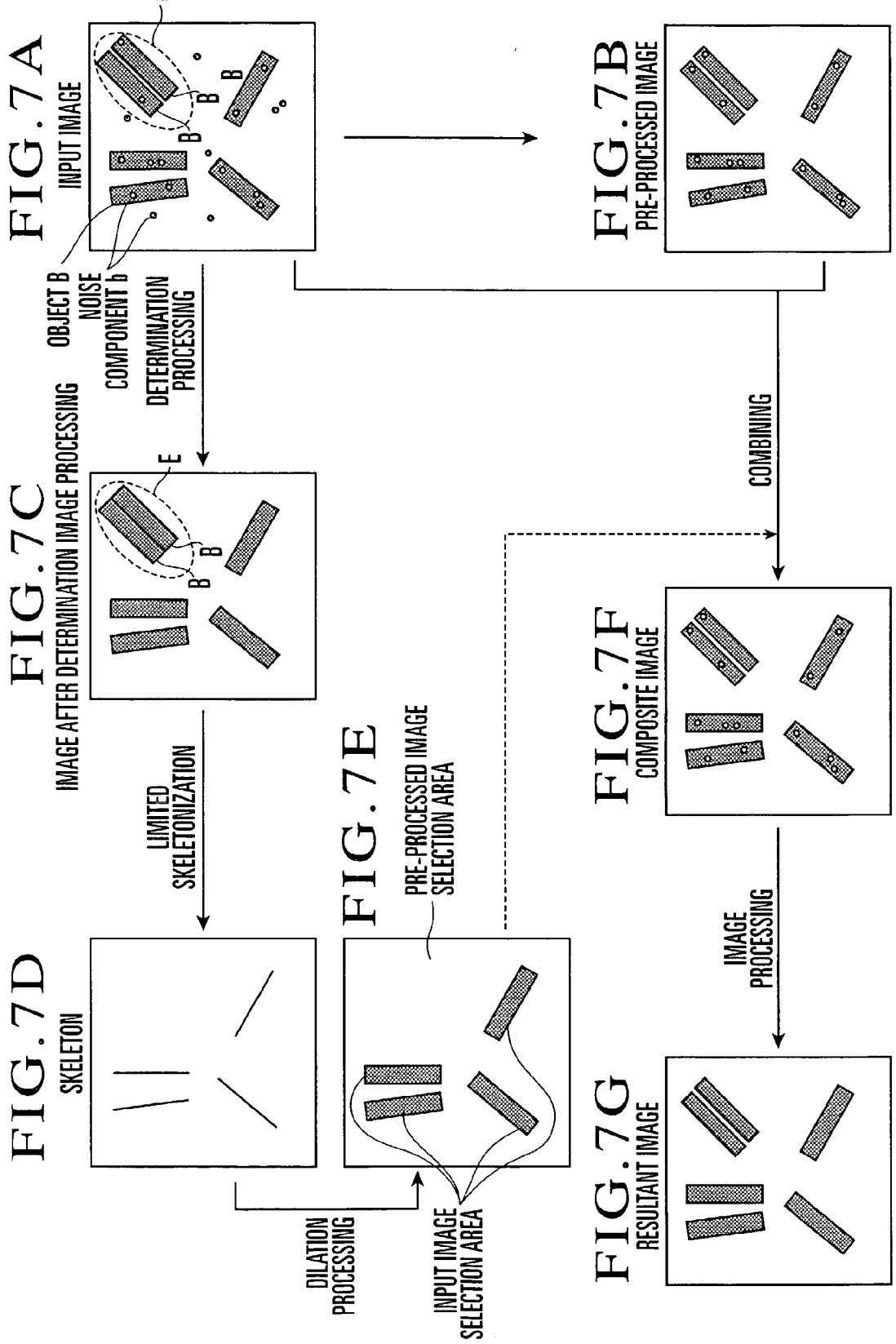

For example, as shown in FIG. 7A, the input image taken by the camera 2 and captured by the image input section 21 is input as an image including a sensed object B and noise components b, other than the sensed object B, which are randomly superimposed on the inner part of the sensed object B and the background portion therearound. FIG. 7A shows a case wherein a plurality of objects are photographed. One sensed object B is an aggregate of pixels, and has a width T and length L, as shown in FIG. 3.

In this case, in order to prevent the occurrence of connection or disconnection on an object image after image processing, the pre-processing section 22 in FIG. 6 performs erosion (erosion processing) of overlaying, for example, the pixel group, obtained by shifting an input image in the horizontal and vertical directions on a pixel basis, on the original pixels and calculating the logical AND (the logical AND in the case of binary display; the minimum value in the case of gradation display (halftone display)) of the luminance. The state shown in FIG. 7B shows the result of this erosion processing, in which the noise components b around the sensed object B are removed. For this pre-processing, one of various methods described with reference to the first conventional method may be used solely or a combination of some of them may be used. More specifically, as pre-processing, instead of erosion processing, the above dilation processing may be performed in which the pixel group obtained by shifting an input image in the horizontal and vertical directions on a pixel basis is overlaid on the pixels of the original input image, and the logical OR (the logical OR in the case of binary display; the maximum value in the case of gradation display (halftone display)) of the luminance values between these pixels, or the above smoothing processing may be performed.

The pixel-specific determining section 25 in FIG. 6 determines for each pixel whether to select the pre-processed image processed by the pre-processing section 22 or the input image so as to form a composite image. In this case, first of all, the determination image processing section 26 removes noise from the input image to generate an image like the one shown in FIG. 7C by consecutively performing the above opening processing and closing processing which are noise removal processing based on morphological operation described with reference to the first conventional method.

That is, the second embodiment performs erosion processing in which the pixel group obtained by shifting an input image in the horizontal and vertical directions on a pixel basis is overlaid on the pixels of the original input image, and the minimum value of the luminance values between these pixels is computed and dilation processing in which the maximum value of the luminance values between the overlaid pixels is computed. In this case, the determination image processing section 26 consecutively performs opening processing (first image processing) of performing dilation processing (second image processing) after erosion processing and closing processing of performing erosion processing after dilation processing, thereby generating an image from which the noise components b are removed. In this determination image processing, one of various methods described with reference to the first conventional method may be used solely or a combination of several methods thereof may be used.

The noise components b are removed from the image processed by the determination image processing section 26, as shown in FIG. 7C. However, two adjacent sensed objects B, like two sensed objects B existing in a local area E in FIG. 7A, are connected to each other to become one sensed object.

For the image processed by the determination image processing section 26 in this manner, the limited skeletonization section 27 then performs skeletonization processing of extracting the skeleton of only a sensed object having a width equal to or less than a given value by, for example, a method using morphology (Petros A. Maragos and Ronald W. Schafer, "Morphological Skelton Representation and Coding of Binary Image", IEEE Transactions on Acoustics, Speech, and Signal Processing, vol. ASSP-34, no. 5, pp. 1228–1244, October 1986).

Providing that the width of the sensed object processed by the determination image processing section 26 is represented by w and the width T of the sensed object shown in FIG. 3 is set as a threshold, the limited skeletonization section 27 performs computations according to inequalities (5) and (6):

$$w \leq T \tag{5}$$

$$w > T \tag{6}$$

In this case, if inequality (5) holds, a skeleton is extracted. If inequality (6) holds, no skeleton is extracted. As a consequence, as shown in FIG. 7D, four line segments corresponding to four objects, excluding the two objects B which are connected to each other in the area E as shown in FIG. 7A, are extracted as the skeletons of the sensed objects. Note that the values of the right sides of inequalities (5) and (6), i.e., the thresholds T, may be set to various values, e.g., multiples of T, in accordance with the purposes.

The dilation processing section 28 dilates the line segments of the image skeletonized by the limited skeletonization section 27 by using the above dilation processing based on morphology, thereby generating a dilated image like the one shown in FIG. 7E and outputting it as a determination result to the combining section 23.

In this case, the combining section 23 selects the pixel value of the pre-processed image processed by the pre-processing section 22 with respect to a pixel whose luminance value falls within the first range, i.e., a pixel in the white area in FIG. 7E, and selects the pixel value of the input image with respect to a pixel whose luminance value falls within the second range, i.e., a pixel in the black area in FIG. 7E. In the case shown in FIG. 7E, the second range of luminance values is defined by the luminance values of the pixels constituting the dilated image in FIG. 7D, and the first range of luminance values is defined by the luminance values of pixels constituting the background portion other than the dilated image. However, luminance values within the first range of luminance values may be set as the luminance values of the pixels constituting the dilated image in FIG. 7D, and luminance values within the second range of luminance values may be set at the luminance values of the pixels constituting the background portion other than the dilated image.

The combining section 23 combines the pre-processed image and input image selected on the basis of the determination result to generate the composite image shown in FIG. 7F. The image processing section 24 performs, for example, the same image processing as that performed by the determination image processing section 26 in FIG. 6 (i.e., consecutively performing opening processing and closing processing) or processing using one of various methods, described with reference to the first conventional method, solely or a combination of several methods thereof, thereby outputting an image representing the processing result shown in FIG. 7G.

According to the first conventional method in which uniform processing is performed for an entire frame, when image processing is performed, two adjacent sensed objects B may be connected to each other as in the local area E in FIG. 7C, resulting in the destruction of the structure of the sensed object. By performing pre-processing (e.g., erosion processing) for preventing the destruction of a sensed object for only a local area where such destruction of the structure of a sensed object occurs, an image from which noise is removed with high precision can be obtained without performing filter processing using pixel information in a relatively large area as in the second conventional method.

The second embodiment has exemplified the processing of the image taken by the camera 2. However, when, for example, the fingerprint image detected by the sensor 3 is processed, an image from which noise is removed with high precision can be obtained.

As described above, according to the second embodiment, an image from which noise is removed with high precision as compared with the first conventional method can be obtained from an input image in which noise components are scattered without destructing the structure of the sensed object B by performing pre-processing for only a local area that requires it without using filter processing using pixel information in a relatively large area as in the second conventional method.

Third Embodiment

FIG. 8 shows an image processing apparatus 1 according to the third embodiment. The third embodiment is constituted by a determination image generating means 50 and a combining means 60 for combining an input image (the image input by image input sections 11 and 21) with the determination image generated by the determination image generating means 50.

The third embodiment has no pre-processing means (pre-processing sections 12 and 22) unlike the arrangements of the first and second embodiments. The combining means 60 receives an input image and determination image.

FIGS. 9A to 9C show the process image processed by the image processing apparatus 1 in FIG. 8. FIG. 9A shows an input image. In the input image shown in FIG. 9A, noise components b exist in objects B, and an object having a narrow portion D is included. As the determination image generating means 50, a determination image generating means (pixel-specific determining section 25) similar to that in the second embodiment in FIG. 6 can be used. The determination image generated by this means becomes the image shown in FIG. 9B.

Referring to FIG. 9B, the combining means 60 selects the pixel value of the input image with respect to a pixel whose luminance value falls within the first range (i.e., a pixel in the white area in FIG. 9B), and selects the pixel value of the determination image with respect to a pixel whose luminance value falls within the second range (i.e., a pixel in the black area in FIG. 9B), and generates a composite image. FIG. 9C shows the composite image. By using the third embodiment, the noise components b are removed from the objects after image combining without eliminating the narrow portion D of the object. Therefore, the noise components b are accurately removed, and the precision of recognition and authentication improves.

As in the first embodiment, an input image can be input to the combining means 60 after pre-processing such as erosion processing is performed for the input image. In this case, background noise can be simultaneously removed.

Fourth Embodiment

FIG. 10 shows an image processing apparatus 1 according to the fourth embodiment. The fourth embodiment is comprised of a determination image generating means 50, a pre-processing means 70, and a combining means 60 for combining an input image, a determination image, and an output image from the pre-processing means 70 by using the determination image from the determination image generating means 50.

In the fourth embodiment, a determination image, input image, and pre-processed image are all input to the combining means 60 unlike in the first to third embodiments. In this case, the combining means 60 includes a means for generating a composite image from the input image and determination image by using the determination image, and also generating a composite image constituted by the generated composite image and the pre-processed image by using the determination image.

FIGS. 11A to 11E show the process image processed by the image processing apparatus 1 in FIG. 10. FIG. 11A shows an input image. In the input image shown in FIG. 11A, noise components b exist in the inner parts of the objects and the background portion. As the determination image generating means 50, a determination image generating means (pixel-specific determining section 25) similar to that in the second embodiment in FIG. 6 can be used. The determination image generated by this means becomes the image shown in FIG. 11B.

As the pre-processing means 70, a pre-processing means (pre-processing section 12) similar to the one in the first embodiment in FIGS. 1A and 1B can be used. FIG. 11C shows the pre-processed image generated by this means.

Referring to FIG. 11B, the combining means 60 selects the pixel value of the input image with respect to a pixel whose luminance value falls within the first range (i.e., a pixel in the white area in FIG. 11B), and selects the pixel value of the determination image with respect to a pixel whose luminance value falls within the second range (i.e., a pixel in the black area in FIG. 11B), and generates a composite image #1. FIG. 11D shows the generated composite image #1. The combining means 60 may OR the data shown in FIGS. 11B and 11A.

The combining means 60 combines the pre-processed image in FIG. 11C with the composite image #1 in FIG. 11D by using the determination image in FIG. 11B.

Referring to FIG. 11B, likewise, the combining means 60 selects the pixel value of the pre-processed image with respect to a pixel whose luminance value falls within the first range (i.e., a pixel in the white area in FIG. 11B), and selects the pixel value of the composite image #1 with respect to a pixel whose luminance value falls within the second range (i.e., a pixel in the black area in FIG. 11B), and generates a composite image #2. FIG. 11E shows the generated composite image #2.

By using the fourth embodiment, noise components existing in the inner parts of objects and background can be removed together with high precision after image combining, as shown in FIG. 11E. In addition, as indicated by an area a in FIG. 11A, objects that are likely to be connected to each other are separated from each other to improve the precision of recognition and authentication.

Fifth Embodiment

FIG. 12 shows an image processing apparatus 1 according to the fifth embodiment. The fifth embodiment is comprised of a determination image generating means 50, a first pre-processing means 71, a second pre-processing means 72, and a combining means 60 for combining an output image from the first pre-processing means 71 and an output image from the second pre-processing means 72 by using a determination image from the determination image generating means 50.

In the fifth embodiment, output images from a plurality of pre-processing means are input to the combining means 60 unlike in the first to fourth embodiments.

Figures 13A, 13B, 13C, 13D, 13E:
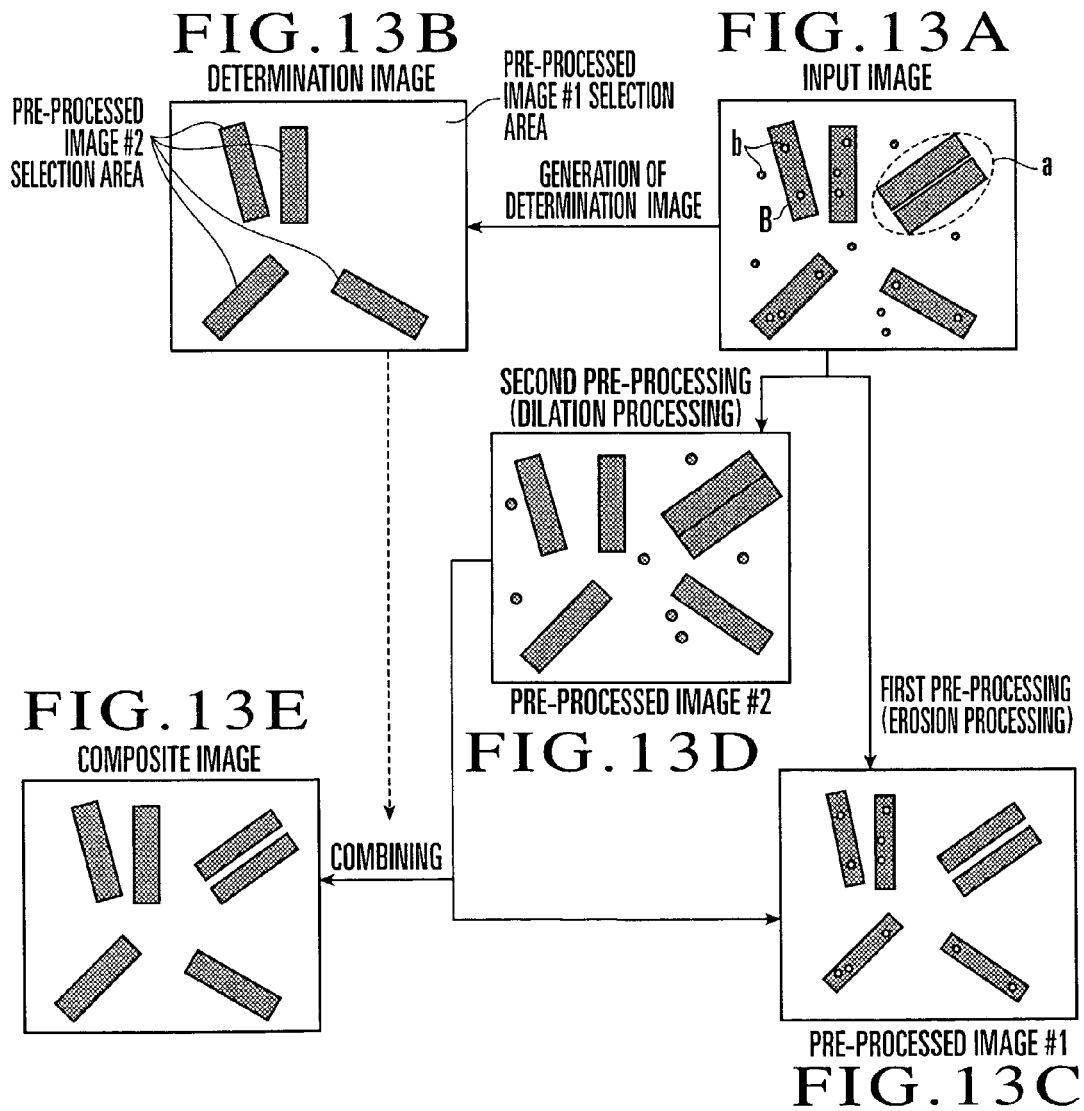

FIGS. 13A to 13E show the process image processed by the image processing apparatus 1 in FIG. 12. FIG. 13A shows an input image. In the input image shown in FIG. 13A, noise components b exist in the inner parts of the objects and the background portion. The determination image generating means 50 generates a determination image from this input image. As the determination image generating means 50, a determination image generating means (pixel-specific determining section 25) similar to that in the second embodiment in FIG. 6 can be used. The determination image generated by this means becomes the image shown in FIG. 13B.

As the pre-processing means 71 and 72, the same processing as that performed by the pre-processing section 12 in the first embodiment or various types of image processing described with reference to the first conventional method can be used. In this embodiment, erosion processing based on morphology is used as pre-processing to be performed by the first pre-processing means 71, and dilation processing based on morphology is used as pre-processing to be performed by the second pre-processing means 72, thereby generating pre-processed images #1 and #2. FIGS. 13C and 13D respectively show the generated pre-processed images #1 and #2.

Referring to FIG. 13B, the combining means 60 selects the pixel value of the pre-processed image #1 in FIG. 13C for a pixel whose luminance value falls within the first range (i.e., a pixel in the white area in FIG. 13B), and selects the pixel value of the pre-processed image #2 for a pixel whose luminance value falls within the second range (i.e., a pixel in the black area in FIG. 13B), and generates a composite image. FIG. 13E shows the generated composite image.

By using the fifth embodiment, noise components existing in the inner parts of objects and background can be removed together with high precision after image combining, as shown in FIG. 13E. In addition, as indicated by an area a in FIG. 13A, objects that are likely to be connected to each other are separated from each other to improve the precision of recognition and authentication. In addition, an image that further improves the precision of recognition and authentication can be generated by combining various pre-processes.

Sixth Embodiment

FIG. 14 shows an image processing apparatus 1 according to the sixth embodiment. In the sixth embodiment, after a composite image is formed by a combining means 60 in the third to fifth embodiments, processing is performed by an image processing means 80 (corresponding to the image processing sections 14 and 24 in the first and second embodiments). For the image processing performed by this image processing means 80, one of various types of image processing described with reference to the first conventional method may be solely used or a combination of several methods thereof may be used in addition to Open (opening processing)-Close (closing processing) using morphology. The addition of the image processing means 80 makes it possible to remove fine noise and the like which cannot be removed by the arrangement constituting components up to the combining means 60.

Seventh Embodiment

FIG. 15 shows an image processing apparatus 1 according to the seventh embodiment. The seventh embodiment is an example of the determination image generating means 50, which is equivalent to the determination image generating means (local-area-specific determining section 15) in the first embodiment shown in FIGS. 1A and 1B from which the first image processing means (determination image processing section 16) for processing an input image and outputting the resultant data to a first counting means 503 (local-area-specific pixel count section 18) is omitted. Note that an image processing means 500 is a means for processing an input image by Open-Close processing using morphology. A skeletonization processing means 502 and second counting means 504 correspond to the skeletonization section 17 and local-area-specific pixel count section 19 in FIGS. 1A and 1B, respectively. In addition, a calculating means 505 and comparing means 506 in FIG. 15 correspond to the local-area-specific comparing section 20 in FIGS. 1A and 1B.

According to the seventh embodiment, if an input image does not have much fine noise, the first image processing means can be omitted. This makes it possible to reduce the processing amount. In this case, according to the first embodiment, an image is equally segmented into blocks as local areas. In the seventh embodiment, as shown in FIGS. 16A to 16C, an image is segmented into uneven local areas. Different thresholds can be used in the comparing means 506 for the respective local areas. This makes it possible to reduce the influence of-density irregularity of an input image. Likewise, the influence of density irregularity in an input image can also be reduced by performing different types of image processing for the respective local areas.

Eighth Embodiment

FIG. 17 shows an image processing apparatus 1 according to the eighth embodiment. The eighth embodiment exemplifies a determination image generating means, which is equivalent to the determination image generating means (local-area-specific determining section 15) in the first embodiment in which a first skeletonization processing means 513 is connected to the output of a first image processing means 511 (determination image processing section 16) for processing an input image by Open-Close processing using morphology. Note that a second skeletonization processing means 514 in FIG. 17 corresponds to the skeletonization section 17 in FIGS. 1A and 1B. In addition, the image processed by the second skeletonization processing means 514 is the image processed by a second image processing means 512 for performing erosion processing for an input image.

FIGS. 18A to 18I show the process image processed by the image processing apparatus 1 in FIG. 17.

In this case, FIG. 18A shows an input image, in which noise components b exist in the inner parts of objects and the background portion. As an image processing means, the same processing as that in the first embodiment or various types of image processing described with reference to the first conventional method can be used. In this embodiment, as image processing performed by the first image processing means 511, Open-Close processing using morphology is used. As image processing performed by the second image processing means 512, erosion processing based on morphology is used. The results obtained by this processing are the images respectively shown in FIGS. 18B an 18C.

For the generated images shown in FIGS. 18B and 18C, the same skeletonization processing means (skeletonization section 17) as that in the first embodiment shown in FIGS. 1A and 1B can be used as the skeletonization processing means 513 and 514. Skeletons #1 and #2 generated by the skeletonization processing means 513 and 514 are the images shown in FIGS. 18D and 18E, respectively.

Subsequently, the numbers of pixels of the generated skeletons #1 and #2 are counted by counting means 503 and 504 for each local area. As the counting means 503 and 504, the same counting means (local-area-specific pixel count sections 18 and 19) as those in the first embodiment shown in FIGS. 1A and 1B can be used. FIGS. 18F and 18G show the results obtained by counting the numbers of pixels of the skeletons shown in FIG. 18D and 18E.

A calculating means 505 can use the same calculating means (local-area-specific comparing section 20) as that in the first embodiment shown in FIGS. 1A and 1B, which divides the count result obtained by the first counting means 503 by the count result obtained by the counting means 504 to obtain a ratio for each local area. FIG. 18H shows the result obtained by this means.

A comparing means 506 compares the calculation result obtained by the calculating means 505 with a threshold. As the comparing means 506, the same comparing means (local-area-specific comparing section 20) as that in the first embodiment shown in FIGS. 1A and 1B can be used. FIG. 18I shows the result obtained by setting the threshold to "1". In this case, the threshold can be set to various values other than "1". The eighth embodiment can simultaneously process objects having different widths without requiring any constant such as an object width for a threshold in the comparing means 506.

Ninth Embodiment

FIG. 19 shows an image processing apparatus 1 according to the ninth embodiment. The ninth embodiment exemplifies a determination image generating means, which is equivalent to the eighth embodiment from which the first image processing means 511 is omitted and which includes an image processing means 501 in place of the second image processing means 512 for performing image processing by using erosion processing based on morphology. This embodiment can be applied to a case wherein an input image does not have much fine noise, and hence the first image processing means 511 (a means for processing an input image by Open-Close processing using morphology) is not required. This reduces the processing amount.

10th Embodiment

FIG. 20 shows an image processing apparatus 1 according to the 10th embodiment. The 10th embodiment exemplifies a determination image generating means, which is equivalent to the determination image generating means (local-area-specific determining section 15) in the first embodiment shown in FIGS. 1A and 1B, from which the first and second image processing means (determination image processing section 16), skeletonization processing means (skeletonization section 17), and the second counting means (local-area-specific pixel count section 19) are omitted. In this case, as a counting means 520, the same counting means (local-area-specific pixel count section 18) as that in the first embodiment shown in FIGS. 1A and 1B can be used. Assume that the luminance values of the pixels constituting an object in an input image define a predetermined range, and the counting means 520 counts the number of pixels whose luminance values fall within the predetermined range for each local area.

As a comparing means 506, the same comparing means (local-area-specific comparing section 20) as that in the first embodiment shown in FIGS. 1A and 1B can be used. If the determination image generating means 50 in this embodiment is used as the determination image generating means (local-area-specific determining section 15) in the first embodiment, a threshold is set to, for example, 2TL, and it is determined that a pre-processed image is selected if the number of pixels exceeds 2TL, and an input image is selected if the number of pixels is smaller than 2TL.

The 10th embodiment can be applied to a case wherein object widths in input images are always the same. Since no image processing is required, the processing amount can be greatly reduced, and high-speed processing can be realized. If, for example, an image processing means for processing an input image by Open-Close processing using morphology and skeletonization processing means are added before the counting means 520, noise can be removed, and the precision can be improved.

11th Embodiment

FIG. 21 shows an image processing apparatus 1 according to the 11th embodiment. The 11th embodiment exemplifies a determination image generating means, which is equivalent to the determination image generating means (pixel-specific determining section 25) in the second embodiment shown in FIG. 6, from which the dilation processing means (dilation processing section 28) is omitted. An image processing means 500 and skeletonization processing means 502 in FIG. 21 correspond to the determination image processing section 26 and limited skeletonization section 27 in FIG. 6, respectively. The 11th embodiment can be applied to a case wherein the widths of objects in an input image are small. This embodiment can attain a reduction in processing amount.

12th Embodiment

FIG. 22 shows an image processing apparatus 1 according to the 12th embodiment. The 12th embodiment exemplifies a determination image generating means, which is equivalent to the determination image generating means (pixel-specific determining section 25) in the second embodiment shown in FIG. 6, in which a second dilation processing means 532 is connected to the output of a first dilation processing means 531 (dilation processing section 28). This embodiment can generate two types of determination images, i.e., the determination image generated by the first dilation processing means 531 and the determination image generated by the second dilation processing means 532.

Figure 23A:
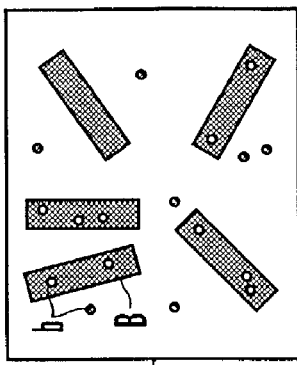
Figure 23B:
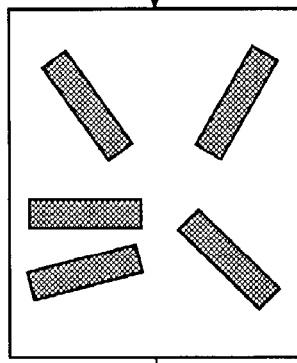

FIGS. 23A to 23E show the process image processed by the image processing apparatus 1 in FIG. 22. FIG. 23A shows an input image, in which noise components b exist in the inner parts of the objects and the background portion. As an image processing means 500, the same image processing means (determination image processing section 26) as that in the second embodiment shown in FIG. 6 can be used. FIG. 23B shows the image processed by this means.

Figure 23C:
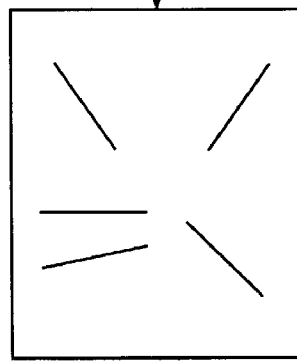
Figure 23D:
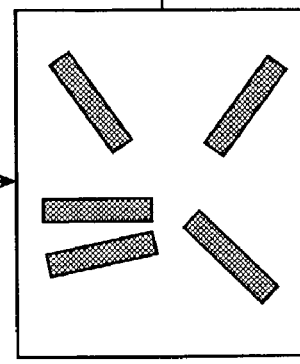

As a skeletonization processing means 502 and the first dilation processing means 531, the same skeletonization processing means (limited skeletonization section 27) and dilation processing means (dilation processing section 28) as those in the second embodiment shown in FIG. 6 can be used. FIGS. 23C and 23D respectively show the images generated by these means.

Figure 23E:
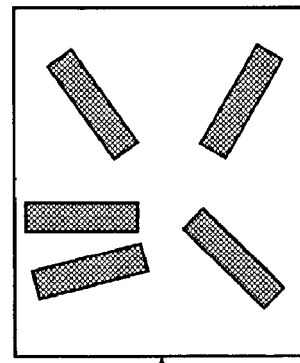

As the second dilation processing means 532, a dilation processing means similar to the first dilation processing means 531 can be used. FIG. 23E shows an determination image #2 generated by this means. According to the 12th embodiment, by generating multilevel determination images (a plurality of determination images), a composite image with higher precision can be generated. In addition, the image obtained by skeletonization processing by the skeletonization processing means 502 can also be used as a determination image.

13th Embodiment

FIG. 24 shows an image processing apparatus 1 according to the 13th embodiment. The 13th embodiment exemplifies a determination image generating means, which concurrently performs dilation processes by the first dilation processing means 531 and second dilation processing means 532 in the 12th embodiment shown in FIG. 22. This makes it possible to increase the processing speed. In addition, like the 12th embodiment in FIG. 22, the 13th embodiment can generate two types of determination images, i.e., the determination image generated by the first dilation processing means 531 and the determination image generated by the second dilation processing means 532 and can also use the image obtained by skeletonization processing done by a skeletonization processing means 502 as a determination image.

14th Embodiment

FIG. 25 shows an image processing apparatus 1 according to the 14th embodiment. The 14th embodiment exemplifies a determination image generating means, which is constituted by a combination of determination image generating means (pixel-specific determining sections 25) in the second embodiment in FIG. 6 which are connected in parallel with each other. As an image processing means in a determination image generating means 50 (#2), a second image processing means 512 for performing erosion processing based on morphology is used. An extracting means 90 generates a determination image by using the images generated by these determination image generating means 50 (#1) and 50 (#2).

FIGS. 26A to 26H show the process images processed by the image processing apparatus 1 in FIG. 25. FIG. 26A shows an input image, in which noise components b exist in the inner parts of the objects and the background portion. As each of the first and second image processing means, an image processing means similar to the determination image processing section 26 in the second embodiment in FIG. 6, various types of image processing described with reference to the first conventional method, or a combination of several methods thereof can be used. As image processing in a first image processing means 511, image processing similar to the generation of a determination image in the second embodiment is performed. As image processing in the second image processing means 512, erosion processing based on morphology is performed. FIGS. 26B and 26C respectively show the resultant images.

The first and second skeletonization processing means perform skeletonization processing for the respective generated images shown in FIGS. 26B and 26C. As each of first an second skeletonization processing means 513 and 514, the same skeletonization processing means (limited skeletonization section 27) in the second embodiment in FIG. 6 can be used. FIGS. 26D and 26E respectively show the skeletons generated by these means.

The first and second dilation processing means perform dilation processing for the respective skeletons shown in FIGS. 26D and 26E. As each of first and second dilation processing means 531 and 532, the same dilation processing means (dilation processing section 28) as that in the second embodiment shown in FIG. 6 can be used. FIGS. 26F and 26G respectively show the images generated by these means.

The extracting means 90 ANDs the images shown in FIGS. 26F and 26G to generate the determination image shown in FIG. 26H.

By combining various determination images in this-manner, an image that can improve the precision of recognition and authentication can be generated.

15th Embodiment

FIG. 27 shows an image processing apparatus 1 according to the 15th embodiment. According to the 15th embodiment, the skeletonization processing means in the first to 14th embodiments is replaced with a limited skeletonization processing means 550. In this case, limited skeletonization is processing in which whether a skeleton of an object is extracted or not can be determined depending on the width of the object. FIG. 27 shows the detailed arrangement of the limited skeletonization processing means 550.

FIGS. 28A to 28M show the process images processed by the limited skeletonization processing means 550 in FIG. 27. The limited skeletonization processing means 550 determines the upper limit of the widths of objects from which skeletons are to be extracted in accordance with a repetition count n stored in a repetition count storage means 560.

FIG. 28A shows an input image, which is an object image having a width corresponding to five pixels and a length corresponding to nine pixels. FIGS. 28B, 28F, and 28J show the images obtained by erosion processing for the input image using an erosion processing means 552 in FIG. 27 with repetition counts of 0, 1, and 2, respectively. FIGS. 28C, 28G, and 28K show the images obtained by dilation-processing for the image, output from the erosion processing means 552, using a dilation processing means 553 in FIG. 27 with repetition counts of 0, 1, and 2, respectively. FIGS. 28D, 28H, and 28L show the images obtained by the processing done by a difference extracting means 554 in FIG. 27, with repetition counts of 0, 1, and 2, respectively, which extracts differences between the input image or the image processed by the erosion processing means 552 and the image processed by the dilation processing means 553. FIGS. 28E, 28I, and 28M show the images obtained by the processing done by a sum generating means 555 in FIG. 27, with repetition counts of 0, 1, and 2, respectively, which combines the preceding and current processed images obtained by the difference extracting means 554.

As shown in FIGS. 28A to 28M, if, for example, the repetition count n is "1", no skeleton is extracted from an object having a width corresponding to five pixels (FIG. 28I). If, however, the repetition count n is "2", a skeleton is extracted from an object having a width corresponding to five pixels (FIG. 28M).

In this case, the upper limit of the widths of objects from which skeletons are extracted can be arbitrarily determined by setting the repetition count n to a certain value. In the 15th embodiment, no skeleton is extracted from an object whose width has considerably increased upon connection to an adjacent object. This makes it possible to determine areas that are likely to connect and extract a skeleton only from the proper central position of an object.

16th Embodiment

FIG. 29 shows the 16th embodiment. In the 16th embodiment, one of the processes described in the first to 15th embodiments or a combination of a plurality of processes thereof is performed for an input image to generate a registration image and collation image used for biometrics authentication using fingerprints, irises, and the like. More specifically, the image generated by performing one of the processes described in the first to 15th embodiments or a combination of a plurality of processes thereof for the image input from a camera 2 or sensor 3 using a processing section 10 is stored in a memory 30.

At the time of collation, the processing section 10 generates a collation image by performing one of the processes described in the first to 15th embodiments or a combination of a plurality of processes thereof. A collating section 110 then collates the collation image with the registration image stored in the memory 30, and outputs the collation result.

The 16th embodiment need not perform filter processing using pixel information in a relatively large area as in the second conventional method, and hence allows a compact, inexpensive biometrics authentication unit 100 to independently generate a registration image and collation image. In addition, since no data is transferred outside from the biometrics authentication unit 100, tampering with data and posing can be prevented.

As has been described above, according to the present invention, when an image including an object image such as a fingerprint is input, erosion processing is performed as pre-processing for the input image. In addition, when the input image is input, the image is segmented into a predetermined number of areas, and the input image is processed in each segmented area. It is then determined for each segmented area, on the basis of the processing result, whether to select the image pre-processed by the processing means or the input image. Meanwhile, the image pre-processed by the processing means, which is selected in accordance with this determination result, is combined with the input image. The resultant composite image is output. This makes it possible to solve the problem that the structure of the sensed object is locally destroyed as in the first conventional method. At the same time, there is no need to perform filter processing using pixel information in a relatively large area as in the second conventional method. Furthermore, an accurate image from which noise is removed with high precision can be provided as an authentication image, thus improving the authentication precision.

In addition to the execution of erosion processing as pre-processing for an input image, the first image processing of performing dilation processing for the input image after erosion processing and the second image processing of performing erosion processing after dilation processing are executed, thereby extracting a skeleton of an object image from the processed image and performing dilation processing. Meanwhile, on the basis of the dilation processing result, the pre-processed image is combined with the input image to generate a composite image, and the first image processing and second image processing are sequentially performed for the composite image. This also makes it possible to solve the problem that the structure of the sensed object is locally destroyed as in the first conventional method. At the same time, there is no need to perform filter processing using pixel information in a relatively large area as in the second conventional method. Furthermore, an accurate image from which noise is removed with high precision can be provided as an authentication image, thus improving the authentication precision.

What is claimed is:

1. An image processing apparatus comprising image correcting means for, when an image of an object is input, performing correction processing for an input image including the object image and outputting the corrected image as an image required for authentication of the object, wherein said image correcting means comprises:

determination image generating means for generating a determination image for determination of the input image;

a plurality of pre-processing means each for performing one of erosion processing in which an input image is set as a first image, the first image is overlaid on a second image obtained by shifting the first image in a predetermined direction on a pixel basis, and a minimum value of luminance values between pixels at the same position on the first and second images is computed and dilation processing in which the input image is set as a first image, the first image is overlaid on a second image obtained by shifting the first image in a predetermined direction on a pixel basis, and a maximum value of luminance values between pixels at the same position on the first and second images is computed; and combining means for combining output images from said plurality of pre-processing means on the basis of the determination image generated by said determination image generating means.

2. An apparatus according to claim 1, wherein said combining means combines the input image and the output images from said plurality of pre-processing means on the basis of the determination image generated by said determination image generating means.

3. An apparatus according to claim 1, wherein said combining means combines the output images from said plurality of preprocessing means and an output image from said determination image generating means on the basis of the determination image generated by said determination image generating means.

4. An apparatus according to claim 1, wherein said determination image generating means comprises:

first counting means for counting the number of pixels having luminance values falling within a predetermined range for each segmented area of an input image;

image processing means for executing first image processing of performing erosion processing in which the input image is set as a first image, the first image is overlaid on a second image obtained by shifting the first image in a predetermined direction on a pixel basis, and a minimum value of luminance values between pixels at the same position on the first and second images is computed and dilation processing in which the image after the erosion processing is set as a first image, the first image is overlaid on a second image obtained by shifting the first image in a predetermined direction on a pixel basis, and a maximum value of luminance values between pixels at the same position on the first and second images is computed, and second image processing of performing the dilation processing upon setting the image after the first image processing as a first image and performing the erosion processing upon setting the image after the dilation processing as a first image;

skeletonization processing means for extracting a central line of the object image from the output image from said image processing means;

second counting means for counting the number of pixels of the image processed by said skeletonization processing means which have luminance values falling within a predetermined range for each of the segmented areas;

calculating means for calculating a ratio between the numbers of pixels respectively counted by said first and second counting means for each of the segmented areas; and comparing means for comparing the ratio between the numbers of pixels calculated by said calculating means with a threshold, and said combining means selects and combines one of the output images form said plurality of pre-processing means on the basis of the comparison result obtained by said comparing means.

5. An apparatus according to claim 4, further comprising, as said skeletonization processing means, limited skeletonization processing means for determining in accordance with a magnitude of a width of the object image whether to extract a central line of the object image.

6. An apparatus according to claim 1, wherein
said determination image generating means comprises:
image processing means for performing erosion processing in which the input image is set as a first image, the first image is overlaid on a second image obtained by shifting the first image in a predetermined direction on a pixel basis, and a minimum value of luminance values between pixels at the same position on the first and second images is computed;
first skeletonization processing means for extracting a central line of the object image from the input image;
second skeletonization processing means for extracting a central line of the object image from the output image from said image processing means;
first counting means for counting the number of pixels of the image processed by said first skeletonization processing means which have luminance values falling within a predetermined range for each of the segmented areas;
second counting means for counting the number of pixels of the image processed by said second skeletonization processing means which have luminance values falling within a predetermined range for each of the segmented areas;
calculating means for calculating a ratio of the numbers of pixels respectively counted by said first and second counting means for each of the segmented areas; and
comparing means for comparing the ratio of the numbers of pixels calculated by said calculating means with a threshold.

7. An apparatus according to claim 6, further comprising, as said skeletonization processing means, limited skeletonization processing means for determining in accordance with a magnitude of a width of the object image whether to extract a central line of the object image.

8. An apparatus according to claim 1, wherein
said determination image generating means comprises:
counting means for counting the number of pixels of an input image which have luminance values falling within a predetermined range for each of predetermined segmented areas; and
comparing means for comparing the number of pixels counted by said counting means with a threshold.

9. An apparatus according to claim 8, wherein said determination image generating means further comprises:
image processing means for executing first image processing of performing erosion processing in which the input image is set as a first image, the first image is overlaid on a second image obtained by shifting the first image in a predetermined direction on a pixel basis, and a minimum value of luminance values between pixels at the same position on the first and second images is computed and dilation processing in which the image after the erosion processing is set as a first image, the first image is overlaid on a second image obtained by shifting the first image in a predetermined direction on a pixel basis, and a maximum value of luminance values between pixels at the same position on the first and second images is computed, and second image processing of performing the dilation processing upon setting the image after the first image processing as a first image and performing the erosion processing upon setting the image after the dilation processing as a first image; and
skeletonization processing means for extracting a central line of the object image from the output image from said image processing means, and said counting means counts the number of pixels of the image processed by said skeletonization processing means which have luminance values falling within the predetermined range for each of the segmented areas.

10. An apparatus according to claim 9, further comprising, as said skeletonization processing means, limited skeletonization processing means for determining in accordance with a magnitude of a width of the object image whether to extract a central line of the object image.

11. An apparatus according to claim 1, wherein
said determination image generating means comprises:
image processing means for executing first image processing of performing erosion processing in which the input image is set as a first image, the first image is overlaid on a second image obtained by shifting the first image in a predetermined direction on a pixel basis, and a minimum value of luminance values between pixels at the same position on the first and second images is computed and dilation processing in which the image after the erosion processing is set as a first image, the first image is overlaid on a second image obtained by shifting the first image in a predetermined direction on a pixel basis, and a maximum value of luminance values between pixels at the same position on the first and second images is computed, and second image processing of performing the dilation processing upon setting the image after the first image processing as a first image and performing the erosion processing upon setting the image after the dilation processing as a first image; and
skeletonization processing means for extracting a central line of the object image from the output image from said image processing means, and
said combining means selects, with respect to the image processed by said skeletonization processing means, one of a pixel of the output images from said plurality of pre-processing means for a pixel whose luminance value falls within a first range, and selects the other of the pixel of the output images from said plurality of pre-processing means for a pixel whose luminance value falling within a second range larger than the first range, combines the selected pixels, and outputs the resultant image as a composite image.

12. An apparatus according to claim 11, wherein
said image processing means and said skeletonization processing means are used as first image processing means and first skeletonization processing means, respectively, and
said determination image generating means comprises:
first dilation processing means for performing the dilation processing for the image processed by said first skeletonization processing means;
second image processing means for performing the erosion processing for the input image;
second skeletonization processing means for extracting a central line of the object image from the output image from said second image processing means;
second dilation processing means for performing the dilation processing for the image processed by said second skeletonization processing means; and
extracting means for extracting a logical AND of the images processed by said first and second dilation processing means and outputting the logical AND as a determination image.

13. An apparatus according to claim 11, further comprising, as said skeletonization processing means, limited skeletonization processing means for determining in accordance with a magnitude of a width of the object image whether to extract a central line of the object image.

14. An apparatus according to claim 1, further comprising image processing means for executing first image processing of performing erosion processing in which the output image from said image correcting means is set as a first image, the first image is overlaid on a second image obtained by shifting the first image in a predetermined direction on a pixel basis, and a minimum value of luminance values between pixels at the same position on the first and second images is computed and dilation processing in which the image after the erosion processing is set as a first image, the first image is overlaid on a second image obtained by shifting the first image in a predetermined direction on a pixel basis, and a maximum value of luminance values between pixels at the same position on the first and second images is computed, and second image processing of performing the dilation processing upon setting the image after the first image processing as a first image and performing the erosion processing upon setting the image after the dilation processing as a first image.

15. An image processing apparatus comprising image correcting means for, when an image of an object is input, performing correction processing for an input image including the object image and outputting the corrected image as an image required for authentication of the object, wherein said image correcting means comprises:
  determination image generating means for generating a determination image for determination of the input image; and
  combining means for combining the input image with an output image from said determination image generating means on the basis of the determination image generated by said determination image generating means, wherein
  said determination image generating means comprises:
  first counting means for counting the number of pixels having luminance values falling within a predetermined range for each segmented area of an input image;
  image processing means for executing first image processing of performing erosion processing in which the input image is set as a first image, the first image is overlaid on a second image obtained by shifting the first image in a predetermined direction on a pixel basis, and a minimum value of luminance values between pixels at the same position on the first and second images is computed and dilation processing in which the image after the erosion processing is set as a first image, the first image is overlaid on a second image obtained by shifting the first image in a predetermined direction on a pixel basis, and a maximum value of luminance values between pixels at the same position on the first and second images is computed, and second image processing of performing the dilation processing upon setting the image after the first image processing as a first image and performing the erosion processing upon setting the image after the dilation processing as a first image;
  skeletonization processing means for extracting a central line of the object image from the output image from said image processing means;
  second counting means for counting the number of pixels of the image processed by said skeletonization processing means which have luminance values falling within a predetermined range for each of the segmented areas;
  calculating means for calculating a ratio between the numbers of pixels respectively counted by said first and second counting means for each of the segmented areas; and
  comparing means for comparing the ratio between the numbers of pixels calculated by said calculating means with a threshold, and
  said combining means selects and combines one of the input image and the output image from said determination image generating means on the basis of the comparison result obtained by said comparing means.

16. An apparatus according to claim 15, wherein
  said first counting means counts the number of pixels of the output image from said image processing means which have luminance values falling within the predetermined range for each of the segmented areas.

17. An apparatus according to claim 15, wherein said image processing means and said skeletonization processing means are used as first image processing means and first skeletonization processing means, respectively,
  said determination image generating means comprises:
  second image processing means for performing the erosion processing for the input image; and
  second skeletonization processing means for extracting a central line of the object image from the output image from said second image processing means, and
  said first counting means counts the number of pixels of an image processed by said first skeletonization processing means which have luminance values falling within a predetermined range for each of the segmented areas, and said second counting means counts the number of pixels of an image processed by said second skeletonization processing means which have luminance values falling within a predetermined range for each of the segmented areas.

18. An apparatus according to claim 15, further comprising, as said skeletonization processing means, limited skeletonization processing means for determining in accordance with a magnitude of a width of the object image whether to extract a central line of the object image.

19. An apparatus according to claim 18, wherein
  said apparatus further comprises setting means for setting an upper limit of the width of the object image, and
  said limited skeletonization processing means extracts a central line from the object image having a width not more than the upper limit set by said setting means.

20. An image processing apparatus comprising image correcting means for, when an image of an object is input, performing correction processing for an input image including the object image and outputting the corrected image as an image required for authentication of the object, wherein said image correcting means comprises:
  determination image generating means for generating a determination image for determination of the input image; and
  combining means for combining the input image with an output image from said determination image generating means on the basis of the determination image generated by said determination image generating means, wherein
  said determination image generating means comprises:
  image processing means for performing erosion processing in which the input image is set as a first image, the first image is overlaid on a second image obtained by shifting the first image in a predetermined direction on a pixel basis, and a minimum value of luminance values between pixels at the same position on the first and second images is computed;

first skeletonization processing means for extracting a central line of the object image from the input image;

second skeletonization processing means for extracting a central line of the object image from the output image from said image processing means;

first counting means for counting the number of pixels of the image processed by said first skeletonization processing means which have luminance values falling within a predetermined range for each of the segmented areas;

second counting means for counting the number of pixels of the image processed by said second skeletonization processing means which have luminance values falling within a predetermined range for each of the segmented areas;

calculating means for calculating a ratio of the numbers of pixels respectively counted by said first and second counting means for each of the segmented areas; and comparing means for comparing the ratio of the numbers of pixels calculated by said calculating means with a threshold, and said combining means selects and combines one of the input image and the output image from said determination image generating means on the basis of the comparing result obtained by said comparing means.

21. An apparatus according to claim 20, further comprising, as said skeletonization processing means, limited skeletonization processing means for determining in accordance with a magnitude of a width of the object image whether to extract a central line of the object image.

22. An image processing apparatus comprising image correcting means for, when an image of an object is input, performing correction processing for an input image including the object image and outputting the corrected image as an image required for authentication of the object, wherein said image correcting means comprises:

determination image generating means for generating a determination image for determination of the input image; and combining means for combining the input image with an output image from said determination image generating means on the basis of the determination image generated by said determination image generating means, wherein said determination image generating means comprises:

counting means for counting the number of pixels of an input image which have luminance values falling within a predetermined range for each of predetermined segmented areas; and comparing means for comparing the number of pixels counted by said counting means with a threshold, and said combining means selects and combines one of the input image and the output image from said determination image generating means on the basis of the comparison result obtained by said comparing means.

23. An apparatus according to claim 22, wherein said determination image generating means comprises:

image processing means for executing first image processing of performing erosion processing in which the input image is set as a first image, the first image is overlaid on a second image obtained by shifting the first image in a predetermined direction on a pixel basis, and a minimum value of luminance values between pixels at the same position on the first and second images is computed and dilation processing in which the image after the erosion processing is set as a first image, the first image is overlaid on a second image obtained by shifting the first image in a predetermined direction on a pixel basis, and a maximum value of luminance values between pixels at the same position on the first and second images is computed, and second image processing of performing the dilation processing upon setting the image after the first image processing as a first image and performing the erosion processing upon setting the image after the dilation processing as a first image; and skeletonization processing means for extracting a central line of the object image from the output image from said image processing means, and said counting means counts the number of pixels of the image processed by said skeletonization processing means which have luminance values falling within the predetermined range for each of the segmented areas.

24. An apparatus according to claim 23, further comprising, as said skeletonization processing means, limited skeletonization processing means for determining in accordance with a magnitude of a width of the object image whether to extract a central line of the object image.

25. An image processing apparatus comprising image correcting means for, when an image of an object is input, performing correction processing for an input image including the object image and outputting the corrected image as an image required for authentication of the object, wherein said image correcting means comprises:

determination image generating means for generating a determination image for determination of the input image; and combining means for combining the input image with an output image from said determination image generating means on the basis of the determination image generated by said determination image generating means, wherein said determination image generating means comprises:

image processing means for executing first image processing of performing erosion processing in which the input image is set as a first image, the first image is overlaid on a second image obtained by shifting the first image in a predetermined direction on a pixel basis, and a minimum value of luminance values between pixels at the same position on the first and second images is computed and dilation processing in which the image after the erosion processing is set as a first image, the first image is overlaid on a second image obtained by shifting the first image in a predetermined direction on a pixel basis, and a maximum value of luminance values between pixels at the same position on the first and second images is computed, and second image processing of performing the dilation processing upon setting the image after the first image processing as a first image and performing the erosion processing upon setting the image after the dilation processing as a first image; and skeletonization processing means for extracting a central line of the object image from the output image from said image processing means, and said combining means selects, with respect to the image processed by said skeletonization processing means, one of a pixel of the input image and a pixel after processing by said skeletonization processing means for a pixel whose luminance value falls within a first range, and selects the other of the pixel of the input image and the pixel after processing by said skeletonization processing means for a pixel whose luminance value falling within a second range larger than the first range, combines the selected pixels, and outputs the resultant image as a composite image.

26. An apparatus according to claim 25, wherein
said determination image generating means comprises:
first dilation processing means for performing the dilation processing for the image processed by said skeletonization processing means; and
second dilation processing means for performing the dilation processing for the image processed by said first dilation processing means, and
outputs at least one of the images processed by said first and second dilation processing means as a determination image.

27. An apparatus according to claim 26, wherein
said determination image generating means outputs the image processed by said skeletonization processing means as a determination image.

28. An apparatus according to claim 25, wherein said determination image generating means comprises first dilation processing means and second dilation processing means which concurrently perform the dilation processing for the image processed by said skeletonization processing means, and outputs at least one of the images processed by said first and second dilation processing means as a determination image.

29. An apparatus according to claim 28, wherein
said determination image generating means outputs the image processed by said skeletonization processing means as a determination image.

30. An apparatus according to claim 25, wherein
said image processing means and said skeletonization processing means are used as first image processing means and first skeletonization processing means, respectively, and
said determination image generating means comprises:
first dilation processing means for performing the dilation processing for the image processed by said first skeletonization processing means;
second image processing means for performing the erosion processing for the input image;
second skeletonization processing means for extracting a central line of the object image from the output image from said second image processing means;
second dilation processing means for performing the dilation processing for the image processed by said second skeletonization processing means; and
extracting means for extracting a logical AND of the images processed by said first and second dilation processing means and outputting the logical AND as a determination image.

31. An apparatus according to claim 25, further comprising, as said skeletonization processing means, limited skeletonization processing means for determining in accordance with a magnitude of a width of the object image whether to extract a central line of the object image.

32. An apparatus according to claim 8, 20, 22 or 25, wherein
said image correcting means includes at least one pre-processing means for performing one of erosion processing in which an input image is set as a first image, the first image is overlaid on a second image obtained by shifting the first image in a predetermined direction on a pixel basis, and a minimum value of luminance values between pixels at the same position on the first and second images is computed and dilation processing in which the input image is set as a first image, the first image is overlaid on a second image obtained by shifting the first image in a predetermined direction on a pixel basis, and a maximum value of luminance values between pixels at the same position on the first and second images is computed, and
said combining means combines the input image, the output image from said determination image generating means, and the output image from said pre-processing means on the basis of the determination image generated by said determination image generating means.

33. An apparatus according to claim 8, 20, 22 or 25, further comprising image processing means for executing first image processing of performing erosion processing in which the output image from said image correcting means is set as a first image, the first image is overlaid on a second image obtained by shifting the first image in a predetermined direction on a pixel basis, and a minimum value of luminance values between pixels at the same position on the first and second images is computed and dilation processing in which the image after the erosion processing is set as a first image, the first image is overlaid on a second image obtained by shifting the first image in a predetermined direction on a pixel basis, and a maximum value of luminance values between pixels at the same position on the first and second images is computed, and second image processing of performing the dilation processing upon setting the image after the first image processing as a first image and performing the erosion processing upon setting the image after the dilation processing as a first image.

34. An image processing method comprising a first step of, when an image of an object is input, performing correction processing for an input image including the object image and outputting the corrected image as an image required for authentication of the object, wherein the process in the first step comprises:
a sixth step of generating a determination image for determination of the input image;
a plurality of seventh steps each performing one of erosion processing in which an input image is set as a first image, the first image is overlaid on a second image obtained by shifting the first image in a predetermined direction on a pixel basis, and a minimum value of luminance values between pixels at the same position on the first and second images is computed and dilation processing in which the input image is set as a first image, the first image is overlaid on a second image obtained by shifting the first image in a predetermined direction on a pixel basis, and a maximum value of luminance values between pixels at the same position on the first and second images is computed; and
an eighth step of combining an output image based on the process in the plurality of seventh steps on the basis of the determination image based on the process in the sixth step.

35. A method according to claim 34, wherein the process in the eighth step includes a ninth step of combining the input image, an output image based on the process in the plurality of seventh steps on the basis of the determination image based on the process in the sixth step.

36. A method according to claim 34, wherein the process in the eighth step includes a 10th step of combining an output image based on the process in the plurality of seventh steps, an output image based on the process in the sixth step on the basis of the determination image based on the process in the sixth step.

37. A method according to claim 34, wherein the process in the sixth step comprises:
- a 46th step of counting the number of pixels having luminance values falling within a predetermined range for each segmented area of an input image;
- a 47th step of executing first image processing of performing erosion processing in which the input image is set as a first image, the first image is overlaid on a second image obtained by shifting the first image in a predetermined direction on a pixel basis, and a minimum value of luminance values between pixels at the same position on the first and second images is computed and dilation processing in which the image after the erosion processing is set as a first image, the first image is overlaid on a second image obtained by shifting the first image in a predetermined direction on a pixel basis, and a maximum value of luminance values between pixels at the same position on the first and second images is computed, and second image processing of performing the dilation processing upon setting the image after the first image processing as a first image and performing the erosion processing upon setting the image after the dilation processing as a first image;
- a 48th step of extracting a central line of the object image from an image based on the process in the 47th step;
- a 49th step of counting the number of pixels of an image based on the process in the 48th step which have luminance values falling within a predetermined range for each of the segmented areas;
- a 50th step of calculating a ratio between the numbers of pixels respectively counted on the basis of the processes in the 46th and 49th steps for each of the segmented areas; and
- a 51st step of comparing the ratio between the numbers of pixels calculated by the process in the 50th step with a threshold.

38. A method according to claim 37, wherein the process in the 48th step includes a 71st step of determining in accordance with a preset magnitude of a width of the object image whether to extract a central line of the object image.

39. A method according to claim 34, wherein the process in the sixth step comprises:
- a 52nd step of performing erosion processing in which the input image is set as a first image, the first image is overlaid on a second image obtained by shifting the first image in a predetermined direction on a pixel basis, and a minimum value of luminance values between pixels at the same position on the first and second images is computed;
- a 53rd step of extracting a central line of the object image from the input image;
- a 51th step of extracting a central line of the object image from the image based on the process in the 52nd step;
- a 55th step of counting the number of pixels of the image based on the process in the 53rd step which have luminance values falling within a predetermined range for each of the segmented areas;
- a 56th step of counting the number of pixels of the image based on the process in the 54th step which have luminance values falling within a predetermined range for each of the segmented areas;
- a 57th step of calculating a ratio of the numbers of pixels respectively counted on the basis of the processes in the 55th and 56th steps for each of the segmented areas; and
- a 58th step of comparing the ratio of the numbers of pixels calculated on the basis of the process in the 57th step with a threshold.

40. A method according to claim 39, wherein the processes in the 53rd and 54th steps include a 72nd step of determining in accordance with a preset magnitude of a width of the object image whether to extract a central line of the object image.

41. A method according to claim 34, wherein the process in the sixth step comprises:
- a 59th step of counting the number of pixels of an input image which have luminance values falling within a predetermined range for each of predetermined segmented areas; and
- a 60th step of comparing the number of pixels counted on the basis of the process in the 59th step with a threshold.

42. A method according to claim 41, wherein the process in the sixth step further comprises:
- a $74^{th}$ step of executing first image processing of performing erosion processing in which the input image is set as a first image, the first image is overlaid on a second image obtained by shifting the first image in a predetermined direction on a pixel basis, and a minimum value of luminance values between pixels at the same position on the first and second images is computed and dilation processing in which the image after the erosion processing is set as a first image, the first image is overlaid on a second image obtained by shifting the first image in a predetermined direction on a pixel basis, and a maximum value of luminance values between pixels at the same position on the first and second images is computed, and second image processing of performing the dilation processing upon setting the image after the first image processing as a first image and performing the erosion processing upon setting the image after the dilation processing as a first image; and
- a $75^{th}$ step of extracting a central line of the object image from the image based on the process in the $74^{th}$ step; and the process in the $59^{th}$ step includes a process of counting the number of pixels of the image based on the process in the $75^{th}$ step which have luminance values falling within the predetermined range for each of the segmented areas.

43. A method according to claim 42, wherein the process in the $75^{th}$ step includes a $76^{th}$ step of determining in accordance with a preset magnitude of a width of the object image whether to extract a central line of the object image.

44. A method according to claim 34, wherein the process in the sixth step comprises:
- a 61st step of executing first image processing of performing erosion processing in which the input image is set as a first image, the first image is overlaid on a second image obtained by shifting the first image in a predetermined direction on a pixel basis, and a minimum value of luminance values between pixels at the same position on the first and second images is computed and dilation processing in which the image after the erosion processing is set as a first image, the first image is overlaid on a second image obtained by shifting the first image in a predetermined direction on a pixel basis, and a maximum value of luminance values between pixels at the same position on the first and second images is computed, and second image processing of performing the dilation processing upon setting the image after the first image processing as a first image and performing the erosion processing upon setting the image after the dilation processing as a first image; and a 62nd step of extracting a central line of the object image from an image based on the process in the 61st step.

45. A method according to claim 44, wherein the process in the sixth step comprises:
a 63rd step of performing the dilation processing for an image processed in the 62nd step;
a 64th step of performing the erosion processing for an input image;
a 65th step of extracting a central line of the object image from an image based on the process in the 64th step;
a 66th step of performing the dilation processing for an image based on the process in the 65th step; and
a 67th step of outputting images based on the processes in the 63rd and 65th steps as determination images.

46. A method according to claim 44, wherein the process in the 62nd step includes a 73rd step of determining in accordance with a preset magnitude of a width of the object image whether to extract a central line of the object image.

47. A method according to claim 34, further comprising an 11th step of executing first image processing of performing erosion processing in which an output image based on the process in the first step is set as a first image, the first image is overlaid on a second image obtained by shifting the first image in a predetermined direction on a pixel basis, and a minimum value of luminance values between pixels at the same position on the first and second images is computed and dilation processing in which the image after the erosion processing is set as a first image, the first image is overlaid on a second image obtained by shifting the first image in a predetermined direction on a pixel basis, and a maximum value of luminance values between pixels at the same position on the first and second images is computed, and second image processing of performing the dilation processing upon setting the image after the first image processing as a first image and performing the erosion processing upon setting the image after the dilation processing as a first image.

48. An image processing method comprising:
a first step of, when an image of an object is input, performing correction processing for an input image including the object image and outputting the corrected image as an image required for authentication of the object, wherein the process in the first step comprises:
a second step of generating a determination image for determination of the input image; and
a third step of combining the input image and an output image based on the process in the second step on the basis of the determination image based on the process in the second step, wherein
the process in the second step includes:
a 12th step of counting the number of pixels having luminance values falling within a predetermined range for each segmented area of an input image;
a 13th step of executing first image processing of performing erosion processing in which the input image is set as a first image, the first image is overlaid on a second image obtained by shifting the first image in a predetermined direction on a pixel basis, and a minimum value of luminance values between pixels at the same position on the first and second images is computed and dilation processing in which the image after the erosion processing is set as a first image, the first image is overlaid on a second image obtained by shifting the first image in a predetermined direction on a pixel basis, and a maximum value of luminance values between pixels at the same position on the first and second images is computed, and second image processing of performing the dilation processing upon setting the image after the first image processing as a first image and performing the erosion processing upon setting the image after the dilation processing as a first image;
a 14th step of extracting a central line of the object image from an output image based on the process in the 13th step;
a 15th step of counting the number of pixels of an output image based on the process in the 14th step which have luminance values falling within a predetermined range for each of the segmented areas;
a 16th step of calculating a ratio between the numbers of pixels respectively counted on the basis of the process in the 12th and 15th steps for each of the segmented areas; and
a 17th step of comparing the ratio between the numbers of pixels calculated in the 16th step with a threshold, and
the process in the third step includes an 18th step of selecting and combining one of the input image and an output image based on the process in the second step on the basis of the comparison result obtained in the 17th step.

49. A method according to claim 48, wherein the process in the 12th step includes a process of counting the number of pixels of an output image based on the process in the 13th step which have luminance values falling within a predetermined range for each of the segmented areas.

50. A method according to claim 48, wherein
the process in the second step comprises:
a 19th step of performing the erosion processing for the input image; and
a 20th step of extracting a central line of the object image from an output image based on the process in the 19th step, and
the process in the 12th step includes a process of counting the number of pixels of an output image based on the process in the 20th step, the pixels having luminance values falling within a predetermined range for each of the segmented areas.

51. A method according to claim 48, wherein the process in the 14th step includes a 43rd step of determining in accordance with a preset magnitude of a width of the object image whether to extract a central line of the object image.

52. A method according to claim 51, wherein a method further comprises a 44th step of setting an upper limit of the width of the object image, and
the process in the 43rd step includes a 45th step of extracting a central line from the object image having a width not more than the set upper limit on the basis of the process in the 44th step.

53. An image processing method comprising:
a first step of, when an image of an object is input, performing correction processing for an input image including the object image and outputting the corrected image as an image required for authentication of the object, wherein the process in the first step comprises:
a second step of generating a determination image for determination of the input image; and
a third step of combining the input image and an output image based on the process in the second step on the basis of the determination image based on the process in the second step, wherein the process in the second step comprises:

a 21st step of performing erosion processing in which the input image is set as a first image, the first image is overlaid on a second image obtained by shifting the first image in a predetermined direction on a pixel basis, and a minimum value of luminance values between pixels at the same position on the first and second images is computed;

a 22nd step of extracting a central line of the object image from the input image;

a 23rd step of extracting a central line of the object image from an output image based on the process in the 21st step;

a 24th step of counting the number of pixels of an image based on the process in the 22nd step which have luminance values falling within a predetermined range for each of the segmented areas;

a 25th step of counting the number of pixels of an image based on the process in the 23rd step which have luminance values falling within a predetermined range for each of the segmented areas;

a 26th step of calculating a ratio of the numbers of pixels respectively counted on the basis of the processes in 24th and 25th steps for each of the segmented areas; and a 27th step of comparing the ratio of the numbers of pixels calculated on the basis of the process in the 26th step with a threshold, and the process in the third step includes a process of selecting and combines one of the input image and an image based on the process in the second step on the basis of the comparison result obtained in the process in the 27th step.

54. A method according to claim 53, wherein the processes in the 22nd and 23rd steps include a 68th step of determining in accordance with a preset magnitude of a width of the object image whether to extract a central line of the object image.

55. An image processing method comprising:

a first step of, when an image of an object is input, performing correction processing for an input image including the object image and outputting the corrected image as an image required for authentication of the object, wherein the process in the first step comprises:

a second step of generating a determination image for determination of the input image; and a third step of combining the input image and an output image based on the process in the second step on the basis of the determination image based on the process in the second step, wherein the process in the second step comprises:

a 28th step of counting the number of pixels of the input image which have luminance values falling within a predetermined range for each of predetermined segmented areas; and a 29th step of comparing the number of pixels counted on the basis of the process in the 28th step with a threshold, and the process in the third step includes a process of selecting and combining one of the input image and the image based on the process in the second step on the basis of the comparison result obtained in the process in the 29th step.

56. A method according to claim 55, wherein
the process in the second step comprises:
a 30th step of executing first image processing of performing erosion processing in which the input image is set as a first image, the first image is overlaid on a second image obtained by shifting the first image in a predetermined direction on a pixel basis, and a minimum value of luminance values between pixels at the same position on the first and second images is computed and dilation processing in which the image after the erosion processing is set as a first image, the first image is overlaid on a second image obtained by shifting the first image in a predetermined direction on a pixel basis, and a maximum value of luminance values between pixels at the same position on the first and second images is computed, and second image processing of performing the dilation processing upon setting the image after the first image processing as a first image and performing the erosion processing upon setting the image after the dilation processing as a first image; and a 31st step of extracting a central line of the object image from the image based on the process in the 30th step, and the process in the 28th step includes a process of counting the number of pixels of the image based on the process in the 31st step which have luminance values falling within the predetermined range for each of the segmented areas.

57. A method according to claim 56, wherein the process in the 31st step includes a 69th step of determining in accordance with a preset magnitude of a width of the object image whether to extract a central line of the object image.

58. An image processing method comprising:

a first step of, when an image of an object is input, performing correction processing for an input image including the object image and outputting the corrected image as an image required for authentication of the object, wherein the process in the first step comprises:

a second step of generating a determination image for determination of the input image; and a third step of combining the input image and an output image based on the process in the second step on the basis of the determination image based on the process in the second step, wherein the process in the second step comprises:

a 32nd step of executing first image processing of performing erosion processing in which the input image is set as a first image, the first image is overlaid on a second image obtained by shifting the first image in a predetermined direction on a pixel basis, and a minimum value of luminance values between pixels at the same position on the first and second images is computed and dilation processing in which the image after the erosion processing is set as a first image, the first image is overlaid on a second image obtained by shifting the first image in a predetermined direction on a pixel basis, and a maximum value of luminance values between pixels at the same position on the first and second images is computed, and second image processing of performing the dilation processing upon setting the image after the first image processing as a first image and performing the erosion processing upon setting the image after the dilation processing as a first image; and a 33rd step of extracting a central line of the object image from the image based on the process in the 32nd step.

59. A method according to claim 58, wherein the process in the second step comprises:

a 34th step of performing dilation processing for an image based on the process in the 33rd step; and a 35th step of performing the dilation processing for an image based on the process in the 34th step, and includes a process of outputting an image based on at least one of the processes in the 34th and 35th steps as a determination image.

60. A method according to claim 59, wherein the process in the second step includes a process of outputting an image based on the process in the 33rd step as a determination image.

61. A method according to claim 58, wherein the process in the second step comprises a 36th step and a 37th step of concurrently performing the dilation processing for an image based on the process in the 33rd step and includes a process of outputting an image based on at least one of the processes in the 36th and 37th steps as a determination image.

62. A method according to claim 61, wherein the process in the second step includes a process of outputting an image based on the process in the 33rd step as a determination image.

63. A method according to claim 58, wherein the process in the second step comprises:

a 38th step of performing the dilation processing for an image based on the process in the 33rd step;

a 39th step of performing the erosion processing for an input image;

a 40th step of extracting a central line of the object image from an image based on the process in the 39th step;

a 41st step of performing dilation processing for an image based on the process in the 40th step; and a 42nd step of extracting a logical AND of images based on the processes in the 38th and 41st steps as a determination image.

64. A method according to claim 58, wherein the process in the 33rd step includes a 70th step of determining in accordance with a preset magnitude of a width of the object image whether to extract a central line of the object image.

65. A method according to claim 40, 53, 44 or 58, wherein the process in the first step comprises at least one fourth step of performing one of erosion processing in which an input image is set as a first image, the first image is overlaid on a second image obtained by shifting the first image in a predetermined direction on a pixel basis, and a minimum value of luminance values between pixels at the same position on the first and second images is computed and dilation processing in which the input image is set as a first image, the first image is overlaid on a second image obtained by shifting the first image in a predetermined direction on a pixel basis, and a maximum value of luminance values between pixels at the same position on the first and second images is computed, and the process in the third step includes a fifth step of combining the input image, an output image based on the process in the second step, and an output image based on the process in the fourth step on the basis of a determination image based on the process in the second step.

66. A method according to claim 40, 53, 55 or 58, further comprising an 11th step of executing first image processing of performing erosion processing in which an output image based on the process in the first step is set as a first image, the first image is overlaid on a second image obtained by shifting the first image in a predetermined direction on a pixel basis, and a minimum value of luminance values between pixels at the same position on the first and second images is computed and dilation processing in which the image after the erosion processing is set as a first image, the first image is overlaid on a second image obtained by shifting the first image in a predetermined direction on a pixel basis, and a maximum value of luminance values between pixels at the same position on the first and second images is computed, and second image processing of performing the dilation processing upon setting the image after the first image processing as a first image and performing the erosion processing upon setting the image after the dilation processing as a first image.

* * * * *